United States Patent [19]

Caiello et al.

[11] 4,293,296
[45] Oct. 6, 1981

[54] APPARATUS AND METHODS FOR MAKING CHEESE TOPPING, AND CHEESE MOLD ASSEMBLIES

[75] Inventors: Joseph A. Caiello, 21 W. Las Flores, Arcadia, Calif. 91006; Ronald J. Caiello, Arcadia, Calif.

[73] Assignee: Joseph A. Caiello, Arcadia, Calif.

[21] Appl. No.: 951,213

[22] Filed: Oct. 13, 1978

Related U.S. Application Data

[63] Continuation-in-part of Ser. No. 847,361, Oct. 31, 1977, abandoned.

[51] Int. Cl.³ .............................................. B29F 1/06
[52] U.S. Cl. .................................... 425/547; 249/81; 249/176; 264/328.7; 425/552; 425/577
[58] Field of Search ............... 425/542, 517, 548, 547, 425/552; 249/81, 142, 121, 176, 205; 264/328.7

[56] References Cited

U.S. PATENT DOCUMENTS

| | | | |
|---|---|---|---|
| 2,341,499 | 2/1944 | Cunningham | 249/142 X |
| 3,543,337 | 12/1970 | Meyn | 425/577 X |
| 4,159,349 | 6/1979 | Caiello | 426/94 |

Primary Examiner—Thomas P. Pavelko
Attorney, Agent, or Firm—Benoit Law Corporation

[57] ABSTRACT

Methods and apparatus for making cheese topping for a pizza pie use a mold assembly providing a cavity for receiving a solidifiable fluid mass of topping cheese. The mold cavity has an outline corresponding to at least part of the outline of the peripheral region of the pizza pie. A number of mutually spaced rods is movable relative to the mold cavity. The relatively movable rods are inserted into the mold cavity to provide for apertures in the molded piece of cheese. The rods are withdrawn from the poured cheese which is removed from the mold after the poured cheese has become sufficiently solidified in the mold to be self-supporting; containing a number of elongate holes corresponding to the mentioned rods. Slices are cut from the solidified piece of cheese to provide cheese topping slices having apertures through which vapor and juice can rise from the food items on the pizza pie shell during baking of the pie.

6 Claims, 35 Drawing Figures

U.S. Patent    Oct. 6, 1981    Sheet 1 of 7    4,293,296
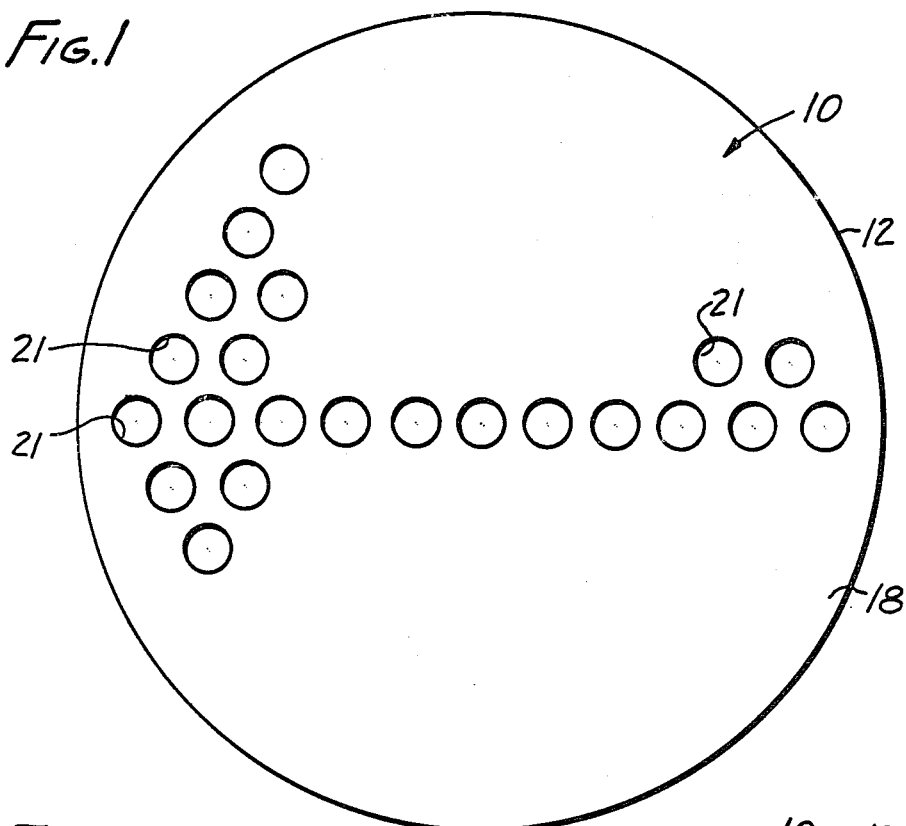
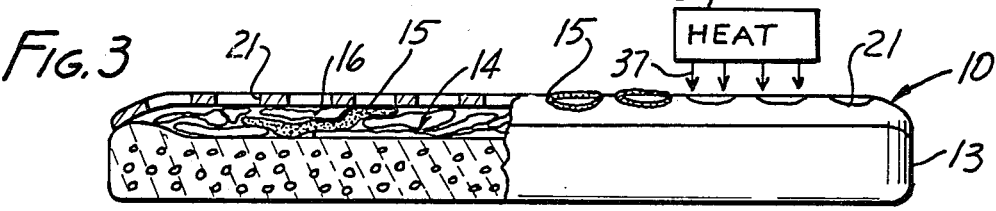
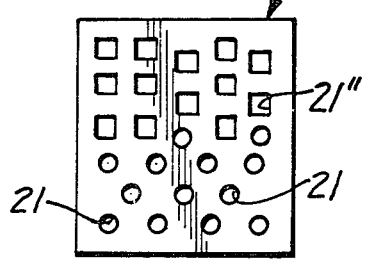

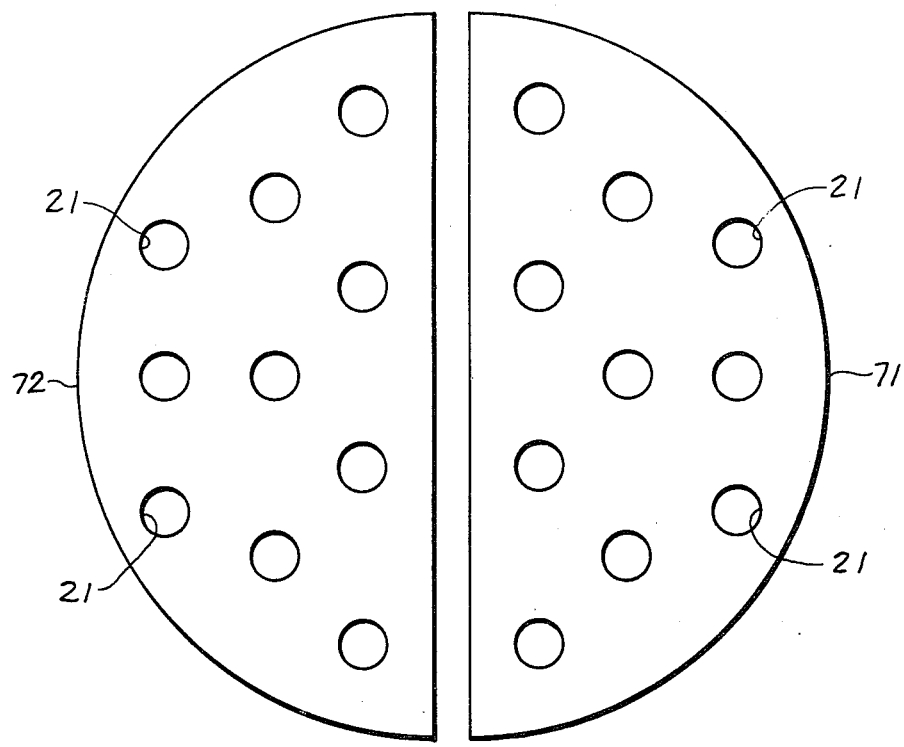
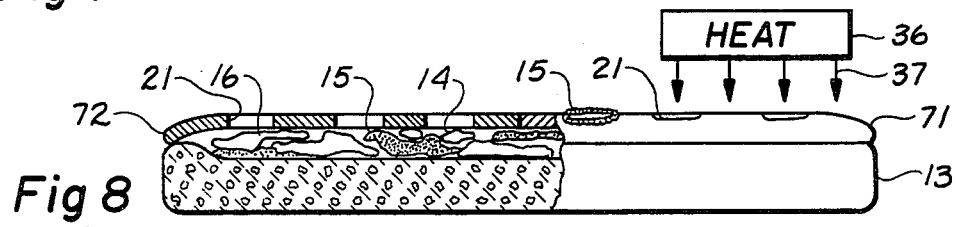
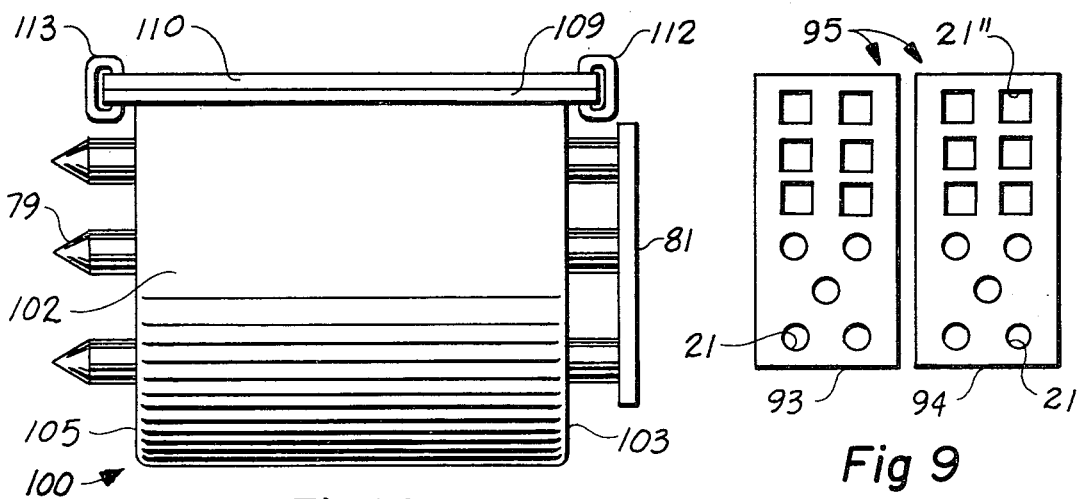

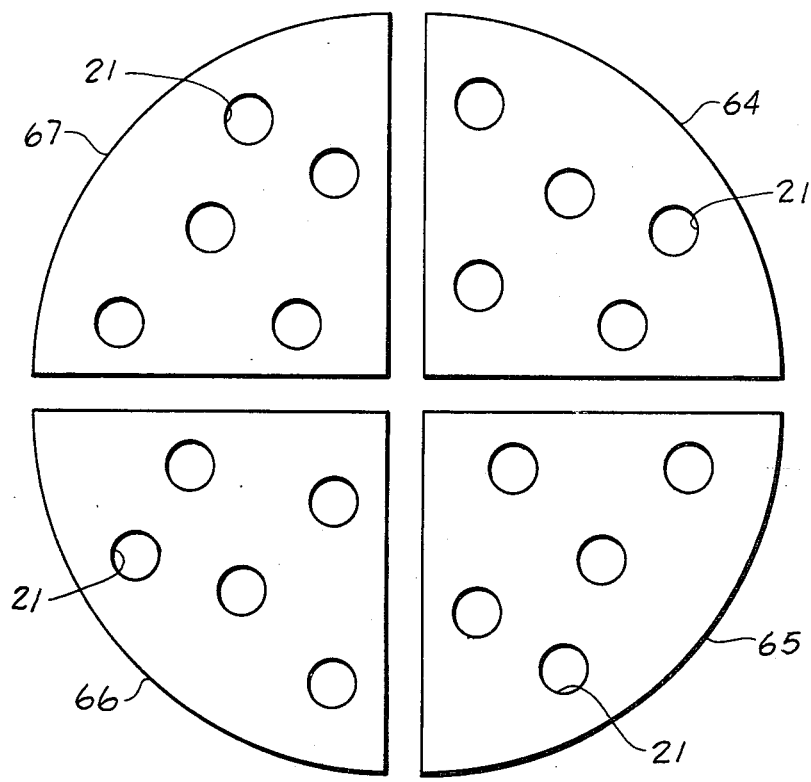
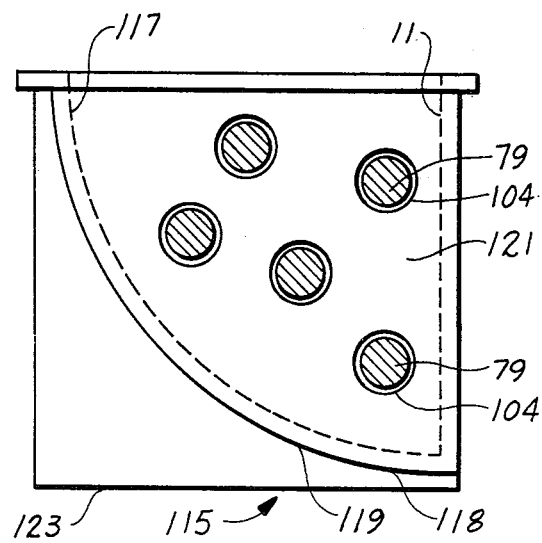
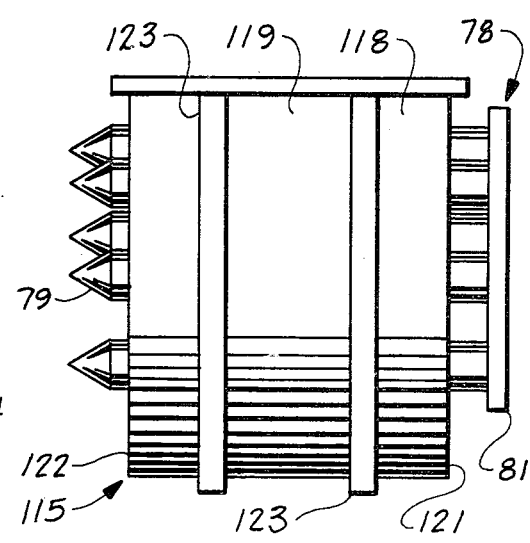

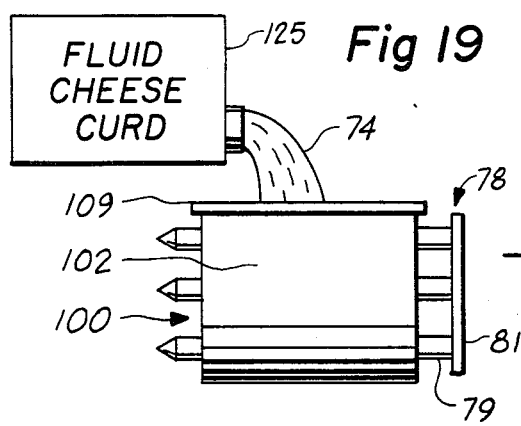
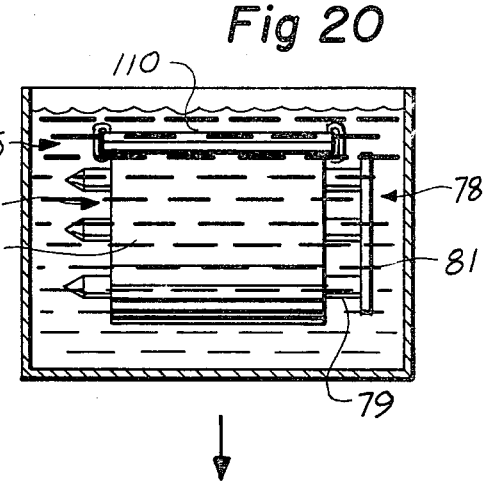
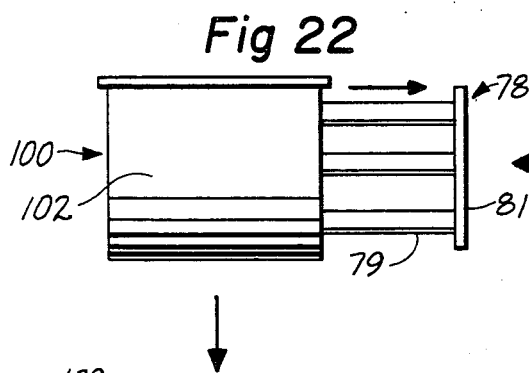
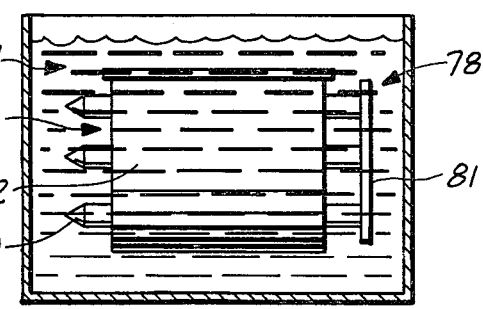
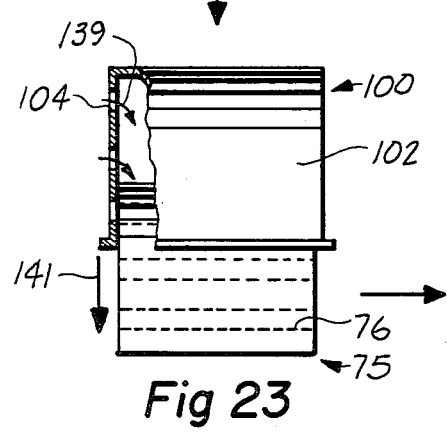
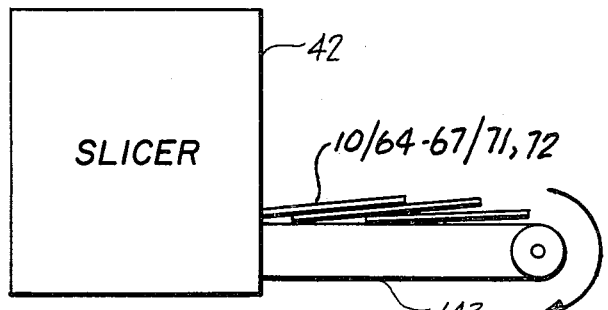
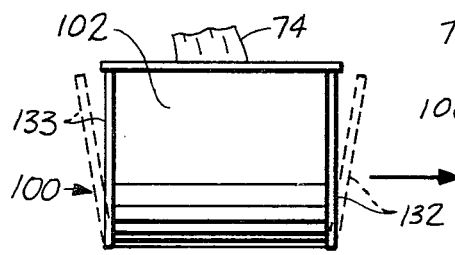
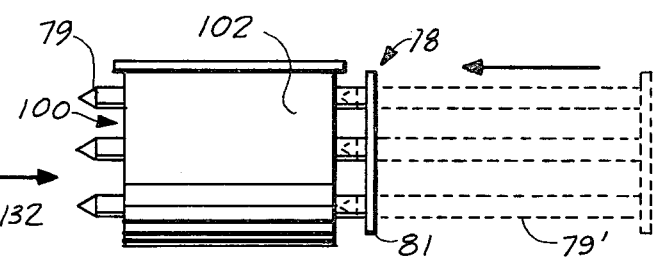

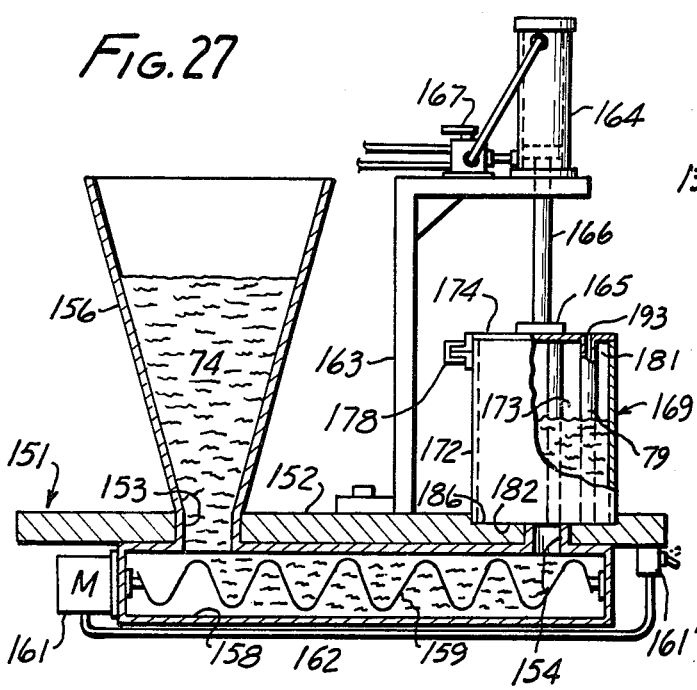
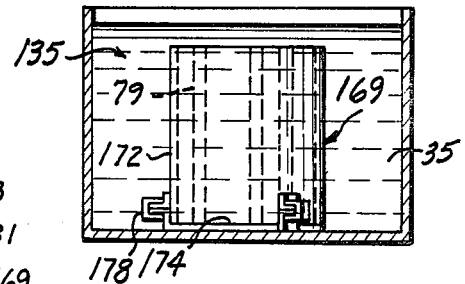
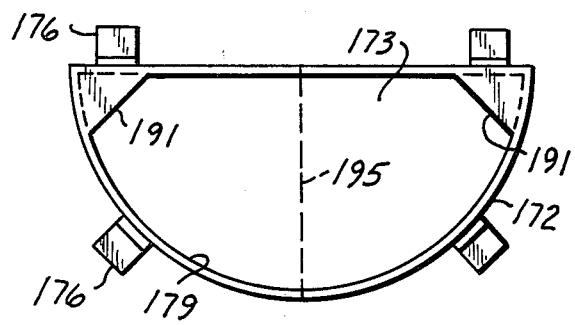
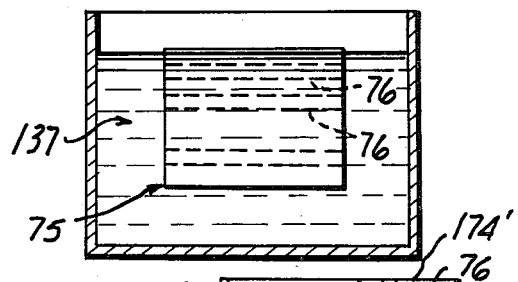
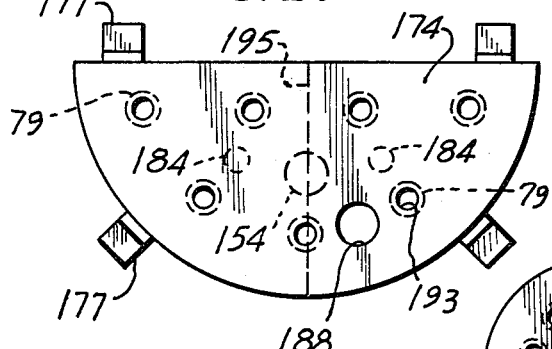
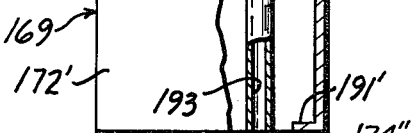
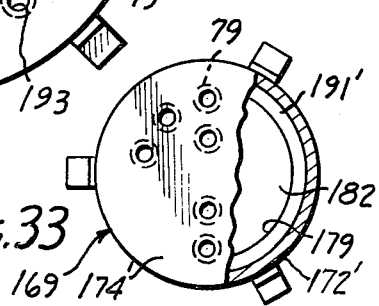
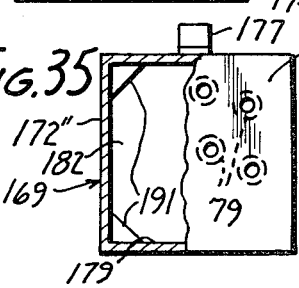

APPARATUS AND METHODS FOR MAKING CHEESE TOPPING, AND CHEESE MOLD ASSEMBLIES

CROSS-REFERENCES

This is a continuation-in-part of Patent Application Ser. No. 847,361, now abanandoned, for Apparatus and Methods for Making Cheese Topping, filed Oct. 31, 1977, by Joseph A. Caiello and Ronald J. Caiello, assigned to said Joseph A. Caiello and herewith incorporated by reference herein.

Reference is also made to the copending Patent Application Ser. No. 847,199 for Pizza Pie and Pie Making Methods, filed Oct. 31, 1977, by Joseph A. Caiello, herewith incorporated by reference herein, and issued as U.S. Pat. No. 4,159,349, on June 26, 1979.

BACKGROUND OF THE INVENTION

1. Field of the Invention

The subject invention relates to pizza pies and similar food products and to methods for making same and, more specifically, to methods and apparatus for making cheese topping and to cheese mold assemblies.

2. Description of the Prior Art

Pizza pies and similar food products traditionally have a cheese covering on top of tomato sauce or other food items and an underlying pie shell. Traditionally, the cheese covering is made by grating or otherwise working cheese into strips or other fine particles which are sprinkled onto the tomato sauce or other food items on the pie shell and which are thereupon fused together by heat.

In actual practice, this kind of application of the cheese covering is a rather onerous task which for its proper performance places far too much reliance on the skill of the operator than should realistically be required of what should really be a routine operation, considering the circumstances under which most pizza pies are made day after day and year after year during rush hours and in very competitive and impatient environments.

As a result, far too many pizza pies available to the public in innumerable parlors, stands and franchise outlets typically have cheese coverings of greatly uneven thickness and textures across the pie. Also, the grated cheese tends to fall or to the side of the pie onto the hot surface of the baking oven, thereby engendering the obnoxious odor of burnt cheese. Besides, considerable time and overhead costs are now consumed in the process of cutting and grinding cheese and in the further process of mearuing out the ground cheese for each pie. Also, the ground or grated cheese tends to dry out and pick up odors from refrigeration or other environments.

Moreover, many otherwise worthy unemployed persons find themselves unable to hold down a job in a pizza parlor because of the high skill required in the application of grated cheese for the production of an even and well-textured cheese covering.

Despite a multitude of prior-art efforts to improve the traditional pizza pie and its manufacture, the art in the specific area herein under consideration has been disappointingly stagnant.

Mechanical equipment for applying topping materials to pizza shells have brought some relief, but have retained some of the problems and introduced new ones.

For instance, the machinery disclosed in U.S. Pat. No. 3,648,596 repeats and extends the prior-art practice of providing and applying the topping material in a shredded or grated condition.

In practice, whether a shredded or grated cheese topping is applied manually or mechanically, the problem of evaporative losses persists. In particular, conventional pizza toppings lose some 20 to 30 percent of their weight by evaporation during baking because of the shredded or grated condition of the cheese topping.

Also, the above mentioned U.S. Pat. No. 3,648,596 does not teach a separate application of the cheese topping on top of a previously applied topping of chopped meat, ground pepperoni, ground sausage and similar topping materials in the traditional tomato sauce on the pizza shell. An application of one or more of such latter topping materials in admixture with shredded cheese is undersirable in practice, since the texture, structure and taste required in or of a pizza pie render it mandatory that the cheese topping in fact constitute the top layer of the pizza pie, to be and to remain on top of the pie, except for some tomato sauce exuding through portions of the cheese topping.

Another drawback of machinery which performs all phases of the pizza topping applying process is that it is capital intensive and thus beyond the reach of most pizza parlor operations, and that it deprives people, who heretofore applied the pizza topping manually of their jobs and livelihood.

In a somewhat related area, a so-called Western style pizza has been proposed (see Woman's Day Encyclopedia of Cookery (Fawcett Publications, New York), Vol. 10, p. 1604). Such "Western style pizza" is prepared by splitting bread lengthwise and spreading the pieces with a tomato mixture. Cheese slices are arranged on top of these tomato-mixture-spread split bread pieces and are sprinkled with grated cheese. This combination is then put under a broiler until bubbly.

While it appears possible that such prior-art use of cheese slices may, for instance, reduce the above mentioned evaporation problem to some extent, the use of cheese slices in addition to, or instead of, grated cheese does not as such solve the problem of providing pizza pies being at least equivalent in texture, structure and composition to a most carefully prepared prior-art pizza pie having grated cheese topping applied by a highly skilled operator.

For instance, prior-art cheese slices applied to the typically round or circular pizza pie shell will leave empty spaces in the cheese topping through which tomato mix can unduly evaporate, and which make for a non-uniform cheese topping. Tailoring prior-art cheese slices to the configuration of pizza pies would put a considerable added burden on the operator or person applying the cheese topping, if a uniformity of composition and texture similar to those attainable by a most carefully applied grated cheese topping were to be realized.

Moreover, conventional slices of the type of cheese actually suitable for pizza pies trap the acid or other vapor and the heat from the tomato mix. In consequence, bubbles form in the cheese topping and often have to be punctured or cut to permit an escape of rising tomato mix vapors and to prevent contact between cheese topping and hot oven parts which would burn the cheese. Even if such bubbles burst of themselves, the erupting gases or vapors tear up the cheese topping and make for an unsightly and uneven textured pie.

This kind of problem also exists to some extent with cheese toppings made of grated cheese, since the heat of the oven causes the grated cheese layer to melt into one or more cheese patches which trap gases and vapor.

Also, conventional cheese toppings are often dislodged when the pie is put into the oven. Especially grated cheese topping tends to fall off the pie by force of inertia in response to any jerky motion of the pie during its insertion into the oven, thereby engendering the above mentioned obnoxious odor of burnt cheese and also impairing the texture of the pie topping.

This problem is also present if conventional cheese slices are used to compose the cheese topping, since such slices also can fall off the pie rather easily.

Also, neither the conventional cheese slices nor grated cheese toppings are capable of retaining the underlying tomato spread on the pie when the same is inserted into the oven in a jerky motion. Rather, tomato mix will be thrown off the pie by force of inertia, thereby contacting hot oven parts, which generates obnoxious odors.

The above mentioned drawbacks of conventional pizza pie making methods are being carried forward to newer developments in this area, as may, for instance, be seen from U.S. Pat. No. 3,667,963.

There presently is a lack of suitable methods and equipment for making improved cheese topping. As the above mentioned U.S. Pat. No. 3,648,596 shows, existing equipment in the pizza pie making field takes the approach of mechanically duplicating manual methods.

Against this prior-art background, the above-referenced copending Patent Application Ser. No. 847,199 has proposed several pioneering improvements and inventions in the pizza pie and pie making arts. Of particular interest with respect to the subject application or patent are certain novel methods for making pizza pies or pizza pie cheese topping, which provide a cheese mold and dowels in the cheese mold for providing apertures in the molded and sliced cheese topping through which vapor and juices can rise from the food items and sauce on this pizza pie. A piece of cheese is cast in the mold having the mentioned apertures provided by its dowels. The cast piece of cheese having the mentioned apertures is removed from the mold and cut into slices. The dowels in the mold forming an embodiment of the invention encompassed by the above-referenced copending Patent Application Ser. No. 847,199 now U.S. Pat. No. 4,159,349 by said Joseph A. Caiello as sole inventor, are stationary in the particular mold. That copending patent application also discloses in FIGS. 18 to 30, 32 and 33 molds with relatively movable rods. However, those molds are only disclosed in that other patent application to provide compliance with 35 USC 112 to set forth the best mode contemplated of carrying out the invention. In particular, the latter molds with relatively movable rods do not belong to the sole invention of the above-referenced patent application Ser. No. 847,199, now U.S. Pat. No. 4,159,349 but rather belong to the joint invention set forth in the subject patent application and its parent application, the above referenced patent application Ser. No. 847,361. Abandoned

SUMMARY OF THE INVENTION

It is a broad object of this invention to overcome the above mentioned disadvantages of conventional methods and apparatus of making pizza pies and pizza pie cheese topping, and of conventional pizza pies and cheese toppings therefor.

It is a germane object of this invention to provide improved methods of making pizza pies and to provide improved pizza pies made by that method.

It is a further object of this invention to provide improved cheese toppings and methods and apparatus for making same.

It is also an object of this invention to provide improved apparatus and mold assemblies for making cheese topping or articles suitable for the manufacture of cheese topping.

Other objects will become apparent in the further course of this disclosure.

The expression "pizza pie" as herein employed is not intended to be limited to the familiar kind of tomato pie by that name, but is intended to be broad enough to cover similar pies having a cheese covering on at least partially vapor or juice emitting food items.

Basically, and above and beyond the cheese making mold construction with fixed dowels shown on the first two drawing sheets of the above-referenced copending patent application Ser. No. 847,199, the cheese molding methods and the mold assemblies according to the subject invention are characterized by (a) molds or cavity-providing devices and (b) rods for providing holes in the cast cheese which in some manner are movable relative to each other, as may be seen from the following paragraphs of this summary, and from the remainder of this disclosure as well.

From one aspect thereof, the subject invention resides in a method of making a cheese topping for a pizza pie of the type having a pie shell including a peripheral region, food items covering said pie shell up to said peripheral region and including a sauce emitting vapor and juice upon heating, and cheese topping on said food items. The invention according to this aspect resides, more specifically, in the improvement comprising in combination the steps of providing a solidifiable fluid mass of pizza pie topping cheese, providing a cavity for receiving said mass in its fluid state, said cavity having an outline corresponding to at least part of an outline of said peripheral region of the pie shell, providing a number of mutually spaced rods being selectively insertable into and removable from said cavity for providing for apertures in said cheese topping through which vapor and juice can rise from said food items including said sauce during baking of said pie, placing said mass in its fluid state into said cavity and providing in said mass in said cavity with said rods for said apertures, subjecting said placed mass of cheese to solidification and providing in said mass with said rods in the course of said solidification a number of elongate holes corresponding to said rods and removing said mass having said elongate holes from said cavity and rods, and cutting from said mass having said elongate holes as many slices of pizza pie topping cheese as necessary for providing said cheese topping in the form of a layer of said pizza pie topping cheese having said apertures through which vapor and juice can rise from said food items including said sauce.

From another aspect thereof, the subject invention resides in a method of making cheese topping for a pizza pie of the type having a pie shell including a circular peripheral region, food items covering said pie shell up to said peripheral region and including a sauce emitting vapor and juice upon heating, and the cheese topping on said food items. The invention according to this aspect resides, more specifically, in the improvement comprising in combination the steps of providing a solidifiable fluid mass of pizza pie topping cheese, providing a cavity for receiving said mass in its fluid state, said cavity having a semicircular cross-section corresponding to one half the area of said pie shell having said circular peripheral region, providing a number of mutually spaced rods being selectively insertable into and removable from said cavity for providing for apertures in said cheese topping through which vapor and juice can rise from said food items including said sauce during baking of said pie, placing said mass in its fluid state into said cavity and providing in said mass in said cavity for said apertures with said rods extending at right angles to said semicircular cross-section, subjecting said placed mass of cheese to solidification and providing in said mass with said rods in the course of said solidification a number of elongate holes corresponding to said rods and removing said mass from said cavity and rods in the form of a semicircular piece of pizza pie topping cheese having said elongate holes, and cutting from said semicircular piece having said elongate holes two semicircular slices of pizza pie topping cheese for providing said cheese topping in the form of a layer composed of said two semicircular slices when contiguously arranged on said food items and having said apertures through which vapor and juice can rise from said food items including said sauce.

From another aspect thereof, the subject invention resides in a method of making cheese topping for a pizza pie of the type having a pie shell including a circular peripheral region, food items covering said pie shell up to said peripheral region and including a sauce emitting vapor and juice upon heating, and the cheese topping on said food items. The invention according to this aspect resides, more specifically, in the improvement comprising in combination the steps of providing a solidifiable fluid mass of pizza pie topping cheese, providing a cavity for receiving said mass in its fluid state, said cavity having a quarter round cross-section corresponding to a quarter of the area of said pie shell having said circular peripheral region, providing a number of mutually spaced rods being selectively insertable into and removable from said cavity for providing for apertures in said cheese topping through which vapor and juice can rise from said food items including said sauce during baking of said pie, placing said mass in its fluid state into said cavity and providing in said mass in said cavity for said apertures with said rods extending at right angles to said quarter round cross-section, subjecting said placed mass of cheese to solidification and providing in said mass with said rods in the course of said solidification a number of elongate holes corresponding to said rods and removing said mass from said cavity and rods in the form of a quarter round piece of pizza pie topping cheese having said elongate holes, and cutting from said quarter round piece having said elongate holes four quarter round slices of pizza pie topping cheese for providing said cheese topping in the form of a layer composed of said four quarter round slices when contiguously arranged on said food items and having said apertures through which vapor and juice can rise from said food items including said sauce.

From another aspect thereof, the subject invention resides in a method of making cheese topping for a pizza pie of the type having a pie shell including a circular peripheral region, food items covering said pie shell up to said peripheral region and including a sauce emitting vapor and juice upon heating, and the cheese topping on said food items. The invention according to this aspect resides, more specifically, in the improvement comprising in combination the steps of providing a solidifiable fluid mass of pizza pie topping cheese, providing a cavity for receiving said mass in its fluid state, said cavity having a circular cross-section corresponding to the area of said pie shell having said peripheral region providing a number of mutually spaced rods being selectively insertable into and removable from said cavity for providing for apertures in said cheese topping through which vapor and juice can rise from food items including said sauce during baking of said pie, placing said mass in its fluid state into said cavity and providing in said mass in said cavity for said apertures with said rods extending at right angles to said circular cross-section, subjecting said placed mass of cheese to solidification and providing in said mass with said rods in the course of said solidification a number of elongate holes corresponding to said rods and removing said mass from said cavity and rods in the form of a circular cylindrical piece of pizza pie topping cheese having said elongate holes, and cutting from said circular cylindrical piece having said elongate holes a circular slice of pizza pie topping cheese for providing said cheese topping in the form of an integral layer of said pizza pie topping cheese having said apertures through which vapor and juice can rise from said food items including said sauce.

From another aspect thereof, the subject invention resides in a method of making cheese topping for a pizza pie of the type having a pie shell including a peripheral region, food items covering said pie shell up to said peripheral region and including a sauce emitting vapor and juice upon heating, and the cheese topping on said food items. The invention according to this aspect resides, more specifically, in the improvement comprising in combination the steps of providing a solidifiable fluid mass of pizza pie topping cheese, providing a cavity extending from a top to an open bottom for receiving said mass in its fluid state, said cavity having an outline corresponding to at least part of an outline of said peripheral region of the pie shell, providing a number of mutually spaced rods extending through said cavity from said top to said bottom and being selectively removable from and insertable into said cavity for providing for apertures in said cheese topping through which vapor and juice can rise from said food items including said sauce during baking of said pie, inserting said rods into said cavity, forcing said mass in its fluid state through said open bottom into said cavity inbetween said inserted rods, subjecting said forced mass of cheese to solidification and providing in said mass with said rods in the course of said solidification a number of elongate holes corresponding to said rods and removing said mass from said cavity and withdrawing said rods from said mass to leave in said mass of cheese a number of elongate holes corresponding to said rods, and cutting from said solidified mass having said elongate holes as many slices of pizza pie topping cheese as necessary for providing said cheese topping in the form of a layer of said pizzie pie topping cheese having said apertures through which vapor and juice can rise from said food items including said sauce.

From another aspect thereof, the subject invention resides in a method of making cheese topping for a pizza pie of the type having a pie shell including a circular peripheral region, food items covering said pie shell up to said peripheral region and including a sauce emitting vapor and juice upon heating, and the cheese topping on said food items. The invention according to this aspect resides, more specifically, in the improvement comprising in combination the steps of providing a solidifiable fluid mass of pizza pie topping cheese, providing a cavity extending from a top to an open bottom for receiving said mass in its fluid state, said cavity having a semicircular cross-section corresponding to one half the area of said pie shell having said circular peripheral region, providing a number of mutually spaced rods extending through said cavity from said top to said bottom and being selectively removable from and insertable into said cavity for providing for apertures in said cheese topping through which vapor and juice can rise from said food items including said sauce during baking of said pie, inserting said rods into said cavity, forcing said mass in its fluid state through said open bottom into said cavity inbetween said inserted rods, subjecting said forced mass of cheese to solidification and providing in said mass with said rods in the course of said solidification a number of elongate holes corresponding to said rods and removing said mass from said cavity in the form of a semicircular piece of pizza pie topping cheese and withdrawing said rods from said mass to leave in said semicircular piece a number of elongate holes corresponding to said rods, and cutting from said semicircular piece having said elongate holes two semicircular slices of pizza pie topping cheese for providing said cheese topping in the form of a layer composed of said two semicircular slices when contiguously arranged on said food items and having said apertures through which vapor and juice can rise from said food items including said sauce.

From another aspect thereof, the subject invention resides in a method of making cheese topping for a pizza pie of the type having a pie shell including a circular peripheral region, food items covering said pie shell up to said peripheral region and including a sauce emitting vapor and juice upon heating, and the cheese topping on said food items. The invention according to this aspect resides, more specifically, in the improvement comprising in combination the steps of providing a solidifiable fluid mass of pizza pie topping cheese, providing a cavity extending from a top to an open bottom for receiving said mass in its fluid state, said cavity having a quarter round cross-section corresponding to a quarter of the area of said pie shell having said circular peripheral region, providing a number of mutually spaced rods extending through said cavity from said top to said bottom and being selectively removable from and insertable into said cavity for providing for apertures in said cheese topping through which vapor and juice can rise from said food items including said sauce during baking of said pie, inserting said rods into said cavity, forcing said mass in its fluid state through said open bottom into said cavity inbetween said inserted rods, subjecting said forced mass of cheese to solidification and providing in said mass with said rods in the course of said solidification a number of elongate holes corresponding to said rods and removing said mass from said cavity in the form of a quarter round piece of pizza pie topping cheese and withdrawing said rods from said mass to leave in said quarter round piece a number of elongate holes corresponding to said rods, cutting from said quarter round piece having said elongate holes four quarter round slices of pizza pie topping cheese for providing said cheese topping in the form of a layer composed of said four quarter round slices when contiguously arranged on said food items and having said apertures through which vapor and juice can rise from said food items including said sauce.

From another aspect thereof, the subject invention resides in a method of making cheese topping for a pizza pie of the type having a pie shell including a circular peripheral region, food items covering said pie shell up to said peripheral region and including a sauce emitting vapor and juice upon heating and the cheese topping on said food items. The invention according to this aspect resides, more specifically, in the improvement comprising in combination the steps of providing a solidifiable fluid mass of pizza pie topping cheese, providing a cavity extending from a top to an open bottom for receiving said mass in its fluid state, said cavity having a circular cross-section corresponding to the area of said pie shell having said peripheral region, providing a number of mutually spaced rods extending through said cavity from said top to said bottom and being selectively removable from and insertable into said cavity for providing for apertures in said cheese topping through which vapor and juice can rise from said food items including said sauce during baking of said pie, inserting said rods into said cavity, forcing said mass in its fluid state through said open bottom into said cavity inbetween said inserted rods, subjecting said forced mass of cheese to solidification and providing in said mass with said rods in the course of said solidification a number of elongate holes corresponding to said rods and removing said mass from said cavity in the form of a circular cylindrical piece of pizza pie topping cheese and withdrawing said rods from said mass to leave in said cylindrical piece a number of elongate holes corresponding to said rods, and cutting from said circular cylindrical piece having said elongate holes a circular slice of pizza pie topping cheese for providing said cheese topping in the form of an integral layer of said pizza pie topping cheese having said apertures through which vapor and juice can rise from said food items including said sauce.

From another aspect thereof, the invention resides in apparatus for making a piece of cheese having parallel elongate holes from a solidifiable fluid mass of cheese, and, in particular, resides in the improvement comprising, in combination, first means including a number of mutually spaced, parallel rods for providing elongate holes, and second means for providing a cavity for receiving said solidifiable fluid mass of cheese and for receiving said rods, with said rods and said second means being movable relative to each other.

From another aspect thereof, the invention resides in apparatus for making a cylindrical piece of cheese having parallel elongate holes from a solidifiable fluid mass of cheese, and, in particular, resides in the improvement comprising, in combination, first means include a number of mutually spaced, parallel rods for providing said elongate holes, and second means for providing a cylindrical cavity for receiving said solidifiable fluid mass of cheese and for receiving said rods in parallel to a longitudinal axis of said cylindrical cavity, with said rods and said second means being movable relative to each other.

From another aspect thereof, the subject invention resides in apparatus for making a piece of cheese having a semicircular cross-section and parallel elongate holes from a solidifiable fluid mass of cheese, and, in particular, resides in the improvement comprising, in combination, first means including a number of mutually spaced, parallel rods for providing said elongate holes, and second means for providing a cavity having a semicircular cross-section for receiving said solidifiable fluid mass of cheese and for receiving said rods in parallel to a longitudinal axis of said cavity, with said rods and said second means being movable relative to each other.

From another aspect thereof, the subject invention resides in apparatus for making a piece of cheese having a quarter round cross-section and parallel elongate holes from a solidifiable fluid mass of cheese, and, in particular, resides in the improvement comprising, in combination, first means including a number of mutually spaced, parallel rods for providing said elongate holes, and second means for providing a cavity having a quarter round cross-section for receiving said solidifiable fluid mass of cheese and for receiving said rods in parallel to a longitudinal axis of said cavity, with said rods and said second means being movable relative to each other.

From another aspect thereof, the subject invention resides in apparatus for making a piece of cheese having parallel elongate holes from a solidifiable fluid mass of cheese, and, in particular, resides in the improvement comprising, in combination, a number of rods for providing said elongate holes, a sleeve laterally enclosing a cavity for receiving said rods and said solidifiable fluid mass of cheese, and a cover for said cavity releasably attachable to said sleeve and having said rods attached thereto in mutually spaced, parallel relationship, said sleeve and said cover with attached rods being movable relative to each other.

From another aspect thereof, the subject invention resides in apparatus for making a piece of cheese having parallel elongate holes from a solidifiable fluid mass of cheese, and, in particular, resides in the improvement comprising, in combination, a number of rods for providing said elongate holes, a sleeve laterally enclosing a cavity for receiving said rods and said solidifiable fluid mass of cheese, a cover for said cavity releasably attachable to said sleeve and having said rods attached thereto in mutually spaced, parallel relationship, said sleeve and said cover with attached rods being movable relative to each other, and means releasably connected to said sleeve for forcing said fluid mass of cheese into said cavity inbetween said rods.

From another aspect thereof, the subject invention resides in apparatus for making a piece of cheese having parallel elongate holes from a solidifiable fluid mass of cheese, and, in particular, resides in the improvement comprising, in combination, a sleeve extending between an open bottom and an open top, means for closing said bottom including a table for supporting said sleeve at said bottom and for jointly providing with said sleeve a cavity for receiving said solidifiable fluid mass of cheese, said table having an opening communicating with said cavity, a lid covering the top of said sleeve, a number of mutually spaced, parallel rods mounted on said lid and extending from said top to said bottom through said sleeve for providing said elongate holes, means releasably coupled to said lid for applying said sleeve to said table, and means connected to said table for extruding said fluid mass of cheese through said opening into said cavity and inbetween said spaced rods.

From another aspect thereof, the invention resides in cheese topping for a pizza pie of the type having a pie shell including a peripheral region, food items covering said pie shell up to said peripheral region and including a sauce emitting vapor and juice upon heating, and the cheese topping on said food items, made by a method comprising in combination the steps of providing a solidifiable fluid mass of pizza pie topping cheese, providing a cavity for receiving said mass in its fluid state, said cavity having an outline corresponding to at least part of an outline of said peripheral region of the pie shell, providing a number of mutually spaced rods being selectively insertable into and removable from said cavity for providing for apertures in said cheese topping through which vapor and juice can rise from said food items including said sauce during baking of said pie, placing said mass in its fluid state into said cavity and providing in said mass in said cavity with said rods for said apertures, subjecting said placed mass of cheese to solidification and providing in said mass with said rods in the course of said solidification a number of elongate holes corresponding to said rods and removing said mass having said elongate holes from said cavity and rods, and cutting from said mass having said elongate holes as many slices of pizza pie topping cheese as necessary for providing said cheese topping in the form of a layer of said pizza pie topping cheese having said apertures through which vapor and juice can rise from said food items including said sauce.

From another aspect thereof, the subject invention resides in cheese topping for a pizza pie of the type having a pie shell including a circular peripheral region, food items covering said pie shell up to said peripheral region and including a sauce emitting vapor and juice upon heating, and the cheese topping on said food items, made by a method comprising in combination the steps of providing a solidifiable fluid mass of pizza pie topping cheese, providing a cavity for receiving said mass in its fluid state, said cavity having a semicircular cross-section corresponding to one half the area of said pie shell having said circular peripheral region, providing a number of mutually spaced rods being selectively insertable into and removable from said cavity for providing for apertures in said cheese topping through which vapor and juice can rise from said food items including said sauce during baking of said pie, placing said mass in its fluid state into said cavity and providing in said mass in said cavity for said apertures with said rods extending at right angles to said semicircular cross-section, subjecting said placed mass of cheese to solidification and providing in said mass with said rods in the course of said solidification a number of elongate holes corresponding to said rods and removing said mass from said cavity in the form of a semicircular piece of pizza pie topping cheese having said elongate holes, and cutting from said semicircular piece having said elongate holes two semicircular slices of pizza pie topping cheese for providing said cheese topping in the form of a layer composed of said two semicircular slices when contiguously arranged on said food items and having said apertures through which vapor and juice can rise from said food items including said sauce.

From another aspect thereof, the subject invention resides in cheese topping for a pizza pie of the type having a pie shell including a peripheral region, food items covering said pie shell up to said peripheral region and including a sauce emitting vapor and juice upon heating, and the cheese topping on said food items, made by a method comprising in combination the steps of providing a solidifiable fluid mass of pizza pie topping cheese, providing a cavity extending from a top to an open bottom for receiving said mass in its fluid state, said cavity having an outline corresponding to at least part of an outline of said peripheral region of the pie shell, providing a number of mutually spaced rods extending through said cavity from said top to said bottom and being selectively removable from and insertable into said cavity for providing for apertures in said cheese topping through which vapor and juice can rise from said food items including said sauce during baking of said pie, inserting said rods into said cavity, forcing said mass in its fluid state through said open bottom into said cavity inbetween said inserted rods, subjecting said forced mass of cheese to solidification and providing in said mass with said rods in the course of said solidification a number of elongate holes corresponding to said rods and removing said mass from said cavity and withdrawing said rods from said mass to leave in said mass of cheese a number of elongate holes corresponding to said rods, and cutting from said solidified mass having said elongate holes as many slices of pizza pie topping cheese as necessary for providing said cheese topping in the form of a layer of said pizza pie topping cheese having said apertures through which vapor and juice can rise from said food items including said sauce.

From another aspect thereof, the subject invention resides in cheese topping for a pizza pie of the type having a pie shell including a circular peripheral region, food items covering said pie shell up to said peripheral region and including a sauce emitting vapor and juice upon heating, and the cheese topping on said food items, made by a method comprising in combination the steps of providing a solidifiable fluid mass of pizza pie topping cheese, providing a cavity extending from a top to an open bottom for receiving said mass in its fluid state, said cavity having a semicircular cross-section corresponding to one half the area of said pie shell having said circular peripheral region, providing a number of mutually spaced rods extending through said cavity from said top to said bottom and being selectively removable from and insertable into said cavity for providing for apertures in said cheese topping through which vapor and juice can rise from said food items including said sauce during baking of said pie, inserting said rods into said cavity, forcing said mass in its fluid state through said open bottom into said cavity inbetween said inserted rods, subjecting said forced mass of cheese to solidification and providing in said mass with said rods in the course of said solidification a number of elongate holes corresponding to said rods and removing said mass from said cavity in the form of a semicircular piece of pizza pie topping cheese and withdrawing said rods from said mass to leave in said semicircular piece a number of elongate holes corresponding to said rods, and cutting from said semicircular piece having said elongate holes two semicircular slices of pizze pie topping cheese for providing said cheese topping in the form of a layer composed of said two semicircular slices when contiguously arranged on said food items and having said apertures through which vapor and juice can rise from said food items including said sauce.

From another aspect thereof, the subject invention resides in a piece of cheese having elongate holes, made by a method comprising in combination the steps of providing a solidifiable fluid mass of cheese, providing a cavity for receiving said mass in its fluid state, providing a number of mutually spaced rods being selectively insertable into and removable from said cavity for providing said holes, placing into said cavity said rods and said mass in its fluid state, subjecting said placed mass of cheese to solidification and providing in said mass with said rods in the course of said solidification a number of elongate holes corresponding to said rods, and removing said mass having said elongate holes from said cavity and rods.

From another aspect thereof, the subject invention resides in a piece of cheese having elongate holes, made by a method comprising in combination the step of providing a solidifiable fluid mass of cheese, providing a cavity for receiving said mass in its fluid state, said cavity having a semicircular cross-section, providing a number of mutually spaced rods being selectively insertable into and removable from said cavity for providing for said holes, placing into said cavity said rods and said mass in its fluid state with said rods extending at right angles to said semicircular cross-section, subjecting said placed mass of cheese to solidification and providing in said mass with said rods in the course of said solidification a number of elongate holes corresponding to said rods, and removing said solidified mass from said cavity and rods in the form of a semicircular piece of cheese having said elongate holes.

From another aspect thereof, the subject invention resides in a piece of cheese having elongate holes, made by a method comprising in combination the steps of providing a solidifiable fluid mass of cheese, providing a cavity extending from a top to an open bottom for receiving said mass in its fluid state, providing a number of mutually spaced rods extending through said cavity from said top to said bottom and being selectively removable from and insertable into said cavity for providing for said holes, inserting said rods into said cavity, forcing said mass in its fluid state through said open bottom into said cavity inbetween said inserted rods, subjecting said forced mass of chesse to solidification and providing in said mass with said rods in the course of said solidification a number of elongate holes corresponding to said rods, and removing said mass from said cavity and withdrawing said rods from said mass to leave in said mass of cheese a number of elongate holes corresponding to said rods.

From another aspect thereof, the subject invention resides in a piece of cheese having elongate holes, made by a method comprising in combination the steps of providing a solidifiable fluid mass of cheese, providing a cavity extending from a top to an open bottom for receiving said mass in its fluid state, said cavity having a semicircular cross-section, providing a number of mutually spaced rods extending through said cavity from said top to said bottom and being selectively removable from and insertable into said cavity for providing for said holes, inserting said rods into said cavity, forcing said mass in its fluid state through said open bottom into said cavity inbetween said inserted rods, subjecting said forced mass of cheese to solidification and providing in said mass with said rods in the course of said solidification a number of elongate holes corresponding to said rods, and removing said mass from said cavity in the form of a semicircular piece of cheese and withdrawing said rods from said mass to leave in said semircircular piece a number of elongate holes corresponding to said rods.

BRIEF DESCRIPTION OF THE DRAWINGS

The invention and its objects and aspects will become more readily apparent from the following detailed description of preferred embodiments thereof, illustrated by way of example in the accompanying drawings, in which like reference numerals designate like or functionally equivalent parts, and in which:

FIG. 1 is a top or bottom view of an apertured integral slice of cheese of sufficient width to cover a pie and food items deposited thereon in one piece;

FIG. 2 is a side view, partially in section, of the integral slice of cheese of FIG. 1;

FIG. 3 is a side view, partially in section, of an article of manufacture including the slice shown in FIGS. 1 and 2;

FIG. 4 is a view, similarly to FIG. 1, on a reduced scale, showing a modification;

FIG. 6 is a top or bottom view of a further cheese topping;

FIG. 7 is a side view, partially in section, of the cheese topping according to FIG. 6;

FIG. 8 is a side view, partially in section, of an article of manufacture including a cheese topping layer composed according to FIGS. 6 and 7;

FIG. 9 is a view, similar to FIG. 6, on a reduced scale, showing a modification;

FIG. 10 is a top or bottom view of a further cheese topping;

FIG. 14 is a side view of a mold assembly for preparing cheese topping according to a further preferred embodiment of the subject invention;

FIG. 17 is an elevation of a mold assembly for preparing cheese topping according to another preferred embodiment of the subject invention;

FIG. 18 is a side view of the mold assembly shown in FIG. 17;

FIGS. 19 to 24 constitute a flow sheet showing use of the mold assemblies of FIGS. 14 to 18 and, in general, showing phases of the preparation of cheese topping in accordance with a preferred embodiment of the subject invention;

FIGS. 25 and 26 show a modification of FIG. 19 in accordance with a preferred embodiment of the invention.

FIG. 27 is a side view of a molding apparatus with mold assembly in accordance with a preferred embodiment of the subject invention;

FIG. 28 is a bottom view of part of the mold assembly, employed in the apparatus of FIG. 27, as seen from the line 28—28 in FIG. 31;

FIG. 29 is a top view of another part of the mold assembly employed in the apparatus of FIG. 27, as seen from the line 29—29 in FIG. 31;

FIGS. 30 to 32, together with FIG. 27, constitute a flow sheet showing use of the mold assembly of FIGS. 28 and 29 in the context of a preparation of cheese topping in accordance with a preferred embodiment of the subject invention; and FIGS. 33 to 35 show modifications of the mold assembly of FIGS. 28 and 29 in accordance with a preferred embodiment.

DESCRIPTION OF PREFERRED EMBODIMENTS

Figure 5:
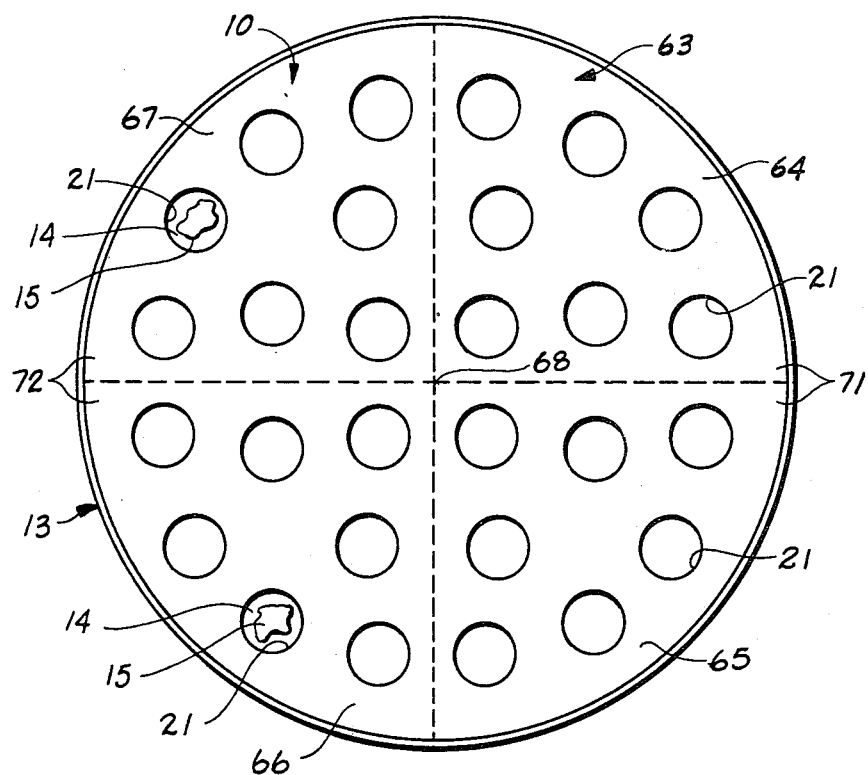
FIG. 5 is a top view of the article of manufacture shown in FIG. 3.

The integral slice of cheese 10 shown in FIG. 1 is round, having a circular periphery 12. The cheese slice 10 is of sufficient width to cover in one piece a pie shell and food items placed thereon.

By way of example, FIG. 3 shows a pie shell 13 of the type used in the manufacture of pizza pies. Typically, the pie shell 13 is made from a bread dough containing high gluten flour. Of course, no limitation to any particular dough or, for that matter, to any particular kind of pie is herein intended.

In accordance with conventional practice, at least partially juice emitting food items 14 are placed on the pie shell 13. In the case of pizza pie, a familiar juice emitting food item is tomato sauce 15 which is spread onto and across the pie shell 13. Other food items or slices thereof may also be placed on the pie shell 13. For instance, food items such a pepperoni, mushrooms, peppers, onions, olives and sausage slices 16 are frequently placed on the pie shell in addition to the tomato sauce.

As already indicated, the integral slice of cheese 10 is of sufficient width to cover the placed food items and also the underlying pie shell in one piece, extending into and along the peripheral region of the pie shell.

In this respect, it will be noted that the term "width" covers not only one dimension, but actually the two-dimensional extent of the cheese slice 10.

The thickness of the cheese slice 10 is bounded by two surfaces 18 and 19. This thickness is essentially uniform and represents the uniform thickness of the cheese covering on the finished pie product.

In accordance with an important feature, the cheese slice 10 is apertured. For instance, the slice 10, prior to its application to the food items 14 and pie shell 13, is provided with uniformly distributed apertures 21 throughout the slice of cheese. Apertures 21 having a diameter or width of from one-quarter inch to one-half inch are presently preferred, as are mutual spacings of the apertures 21 by distances of from one-quarter inch to one inch.

The apertured nature of the cheese slice or disk 10 is essential, in that the apertures 21 provide vents for tomato sauce or other juices rising from the food items 14 during the baking of the pie. Without such vents, any integral cheese layer on the pie would bubble up, thereby in effect destroying the pie or at least the desired appearance or constitution thereof. Especially in the case of the traditional type of pizza pie, it is important that part of the tomato sauce will come to be located on top of the cheese covering during the baking process. Provision of the apertures 21 at a uniform distribution or regular pattern in accordance with a preferred embodiment of the subject invention assures in practice uniformity of the pie composition and constitution throughout its width.

This is considered important not only in terms of appearance, but also in terms of taste.

Various techniques and apparatus for molding and/or slicing cheese are known in the food processing art, as may, for instance, be seen from the incorporated above mentioned patents.

Typically, the integral apertured cheese slice 10 is initially in an uncooked state, at least relative to the cooking or heating it will be subjected to during the final baking of the pie. The uncooked apertured integral slice of cheese is applied to the pie shell 13 and deposited food items 14 as shown in FIG. 3. As indicated above, the applied uncooked apertured integral slice of cheese on the food items 14 and pie shell 13 is of sufficient width to cover these food items and pie shell in one piece. If desired, the intermediate product thus prepared may be sold and distributed in this form for subsequent baking by or for the consumer at the point of consumption.

The integral slice of cheese may be square or rectangular as shown at 10" in FIG. 4. Also, the apertures may then be round as shown at 21, rectangular or square as shown at 21", or may have any other desired shape.

In practice, one or more cheese or cheese blends may be employed. For instance, the cheese slice 10 in the case of pizza pie may be made of mozzarella, Parmesan, Muenster or jack cheese or blends thereof.

As indicated only in diagrammatic form at 36 in FIG. 3, the apertured integral slice of cheese 10, covered food items 14 and pie shell are subject to heat 37 whereby juices from the covered tomato sauce and/or other food items are caused to rise through the apertures 21 in the integral slice of cheese and whereby this integral slice of cheese is cause to soften into partial conformity with the placed or positioned food items on the pie shell 13. This heating process, which may be carried out in an oven, is typically continued until the pie has been baked and is ready for serving.

It will be recognized that no grinding or grating of cheese and no measured and skillful application of grated cheese to the pie are necessary when the cheese topping slices herein shown are used. Rather, the cheese slices may readily be removed from a packaged stack of such slices, and may be applied even by an unskilled person in order to produce a cheese covering which is characterized by a large uniformity of thickness and texture between the apertures 21.

By using the apertured cheese slices herein shown, the time required for making pizza pie is very considerably reduced and no obnoxious odors from fallen off and burnt cheese particles will result. The cut cheese slices can easily be retained in a package that, up to the point of actual use of the cheese slices will prevent the cheese product from picking up odors from refrigeration or other environments.

As more fully set forth below, the single cheese topping layer on the pizza pie may be composed of up to four geometrically congruent slices of pizza pie topping cheese. This includes the integral single slice of cheese 10 shown in FIGS. 1 to 3 hereof, as well as the semicircular slices shown in FIGS. 6 to 8 and the quarter round slices shown in FIG. 10, for instance.

With reference to FIGS. 3 and 5, it will be recalled that the pizza pie presently under consideration is of the type having a pie shell 13 including a peripheral region food items 14 covering the pie shell up to that peripheral region and including a sauce 15 emitting vapor and juice upon heating, and the cheese topping on the food items. In the embodiment shown in FIGS. 1 to 3, the cheese topping is in the form of an integral slice of pizza pie topping cheese 10, and is dimensioned to cover the food items 14 and extend along and into the peripheral region of the pie shell in one piece, when the integral slice 10 is arranged on the food items. The integral slice 10 has or is provided with several apertures 21 through which vapor and juice can rise from the food items including the sauce 15.

The integral slice 10 is arranged on the food items to cover these food items and extend into the peripheral region of the pie shell in one piece. The food items 14, including the sauce 15, are retained on the pie shell 13 with the weight of the integral slice against lateral forces of inertia occurring during handling of the pie prior to heating.

In particular, and as mentioned above, conventional cheese toppings are often dislodged when the pie is put into the oven. Especially grated cheese topping, and to some extent also conventional strips or slices of cheese, tend to fall off the pie by force of inertia in response to any jerky motion of the pie during its insertion into the oven, thereby engendering the above mentioned obnoxious odor of burnt cheese and also impairing the texture of the pie topping.

The weight of the cheese topping 10 according to the subject invention retains the food items including the sauce 15 on the pie shell with its weight. This effect is particular strong when the cheese topping consists of one integral slice of cheese as shown in FIGS. 1 to 3. In practice, this effect is also present when the cheese topping is composed of two contiguously arranged semicircular slices as shown in FIGS. 6 to 8, or even when the cheese topping is composed of up to four contiguously arranged slices of cheese as shown in FIGS. 5 and 10.

The showing of FIG. 5 is universal to the three main versions of the cheese topping according to the subject invention.

For instance, and as already explained above, the cheese topping can consist of one integral cheese slice which, as shown at 10 in FIGS. 1 to 3 and 5 may be circular for circular pizza pies or as shown in FIG. 4 at 10" may be square for square pizza pies.

In either case, the integral slice 10 or 10" extends into and along the periphery or perimeter of the pie.

As also shown in FIG. 5, a cheese topping 63 may be made by providing up to four geometrically congruent slices of pizza pie topping cheese 64, 65, 66 and 67. Each of these slices is dimensioned to extend from the center 68 of the pie into the peripheral region 62 and to extend along a portion of that peripheral region corresponding to the length of such peripheral region divided by the number of the up to four slices.

For instance, if the up to four slices are in fact one slice 10, then that slice 10 extends along the entire length of the peripheral region 62. On the other hand, it the slices are four in number as shown in FIG. 5 at 64 to 67, then each slice extends along a different quarter of the length of the peripheral pie region 62. By way of further example, if the number of slices per pie topping is two, such as in the case of semicircular slices, then each slice extends along one half of the peripheral region of the pie shell.

The up to four slices (such as one, two or four slices) per cheese topping are further dimensioned jointly to cover the food items and extend along and into the peripheral region 62 in one layer composed of these slices when contiguously arranged on the food items. As already discussed, each of the slices is provided with several apertures through which vapor and juice can rise from the food items including the sauce.

With reference to FIG. 10, and as shown in FIG. 5, the up to four apertured slices 64 to 67 are contiguously arranged on the food items to form the above mentioned one layer covering the food items and extending into the peripheral region.

As indicated above, the resulting cheese topping layer retains the food items including the sauce 15 on the pie shell 13 with the weight of the contiguously arranged apertured slices against lateral forces of inertia occurring during handling of the pie prior to heating. The pie shell 13, contiguously arranged apertured slices of cheese 64 to 67 and covered food items 14 including the sauce 15 are subjected to heat whereby vapor and juice are caused to rise from the covered food items 14 including the sauce 15 through the apertures 21 in slices of cheese, and the slices of cheese are caused to soften into partial conformity with the food items on the pie shell. The result is a pizza pie of superior quality in terms of tastiness, texture and distribution of the cheese topping. In particular, the acid or other vapor and the heat from the tomato sauce or mix can rise through the cheese topping and the formation of large bubbles is effectively avoided.

From the point of view of uniformity and integrity, the version providing the cheese topping in one integral slice of cheese presently appears the most preferable.

From the point of view of ease of manufacture, packaging and handling, the version employing four slices of cheese 64 to 67 appears to have its advantages.

However, the presently most preferred version from an overall point of view, including quality of the cheese topping in the light of ease of manufacture, slicing, packaging and handling, is the version which composes each topping layer of two semicircular pieces of cheese.

Two semicircular pieces of pizza pie topping cheese are indicated in FIG. 5 with the aid of reference numerals 71 and 72 having brackets associated therewith. In particular, the bracket associated with the reference numeral 71 is intended to indicate that the semicircular slice of cheese 71 extends over the quarter round sections 64 and 65. Similarly, the bracket associated with the reference numeral 72 is intended to indicate that the semicircular slice of cheese extends over the quarter round sections 66 and 67. The semicircular cheese slices 71 and 72 indicated in FIG. 5 are perhaps more clearly apparent from FIG. 6.

Accordingly, in line with the presently most preferred version from an overall point of view, there are provided two semicircular slices of pizza pie topping cheese 71 and 77. The two semicircular slices 71 and 72 are dimensioned jointly to cover the food items and extend along and into the circular peripheral region 62 of the pie shell in one layer composed of the two slices when contiguously arranged on the food items.

Again, each of the slices 71 and 77 is provided with several apertures 21 through which vapor and juice can rise from the food items including the sauce 15. As shown in FIGS. 5 and 8, the apertured semicircular slices 71 and 72 are contiguously arranged on the food items to form the one layer covering the food item and extending into the peripheral region 62. Again, the food items including the sauce 15 are retained on the pie shell with the weight of the contiguously arranged apertured slices 71 and 72 against lateral forces of inertia occurring during handling of the pie prior to heating.

The pie shell, contiguously arranged apertured slices of cheese 71 and 72 and covered food items including the sauce 15 are subjected to heat as indicated in FIG. 8 at 36, whereby vapor and juice from the covered food items including the sauce 15 are caused to rise through apertures 21 in the slices of cheese 71 and 72, and these slices are caused to soften into partial conformity with the food items on the pie shell.

The uniform distribution and dimensioning of the apertures 21, as well as their preferred mutual spacing, may be similar in all versions herein shown. Also, the apertures may be provided in the same manner in all cheese topping pie versions herein shown.

Those skilled in the pizza pie making art will, of course, recognize that the expression "food items including the sauce 15" and language of similar import herein employed, cannot mean that there are always food items other than the sauce itself in the layer of sauce between the pie shell and cheese topping layer. Rather, it is quite common in the pizza pie making art to spread only tomato sauce on the pie shell, to cover that tomato sauce with the cheese topping, and to place food items other than the tomato sauce, such as pepperoni, mushroom, peppers, onion, olive and sausage pieces or slices, thereafter on top of the cheese topping. In some instances, it has even been customary to place further cheese topping on top of the first cheese topping and food items already on top of the pie shell and tomato sauce layer.

All such and similar variations are, of course, intended to be covered by the subject invention and encompassed by its scope, with the word "including" and like expressions used in conjunction with the term "sauce" being given their broadest meaning, ranging in effect from a mere inclusion, such as when the sauce 15 is just one of two or more items 15 and 16 of the food items 14, to the concept of "comprising" in cases where the sauce 15 is the predominant food item 14, and on to the concept of "consisting" where the sauce 15 actually is the only of the food items 14 between the pie shell 13 and cheese topping 10, 63, etc., with all the other food items 16 being located on top of the cheese topping 10, 63, etc.

In terms of methods, the subject invention extends to the pizza pie making methods and to the cheese topping making methods herein disclosed. In terns of articles of manufacture, the subject invention extends to pizza pies and also to cheese toppings made by methods herein disclosed.

In terms of articles of manufacture, the subject invention also extends to the pizza pie structures in an uncooked or cooked state, and to the cheese toppings herein disclosed.

Figure 11:
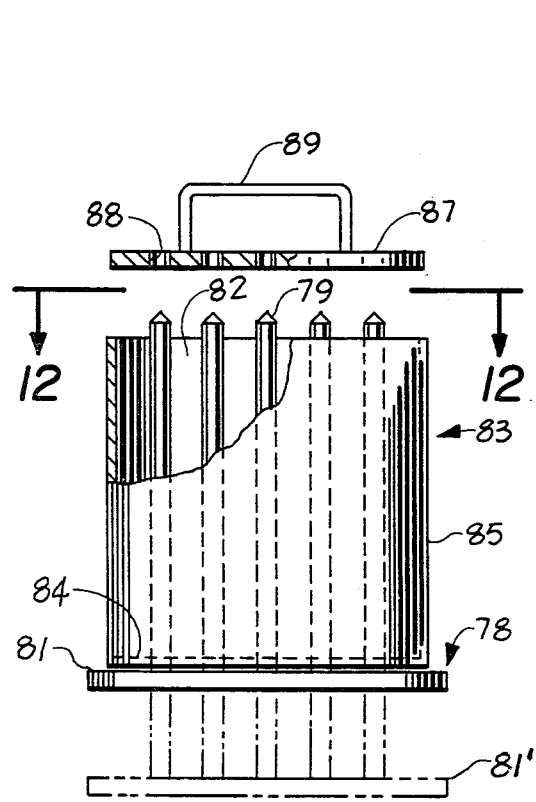
FIG. 11 is a side view of a mold assembly for preparing cheese topping according to a preferred embodiment of the subject invention.

Further methods and equipment for making cheese topping according to the subject invention, and articles useful as intermediate products, will now be disclosed with the aid of FIGS. 11 et seq.

According to the invention, the mold assemblies shown in FIGS. 11 to 23 and 25 and 35 serve to make, from a solidifiable fluid mass of cheese 74 (see FIGS. 19 and 21), pieces of cheese 75 having parallel elongate holes 76 (see FIGS. 23 and 32). All these assemblies according to the illustrated preferred embodiments have first means generally designated by a reference numeral 78 and including a number of mutually spaced, parallel rods 79 for providing the elongate holes 76. Also in accordance with the subject invention, the rods 79 are movable relative to the mold or mold cavity into which the solidifiable mass of cheese is poured or forced. In practice, that broad concept of mobility not only covers a technique wherein rods are moved into or out of a mold cavity, but extends also to methods and equipment wherein the mold or an outer sleeve thereof is stripped from an at least partly solidified mass of cast cheese or is otherwise moved with respect to the rods 79.

In accordance with the illustrated preferred embodiments, the first means include a plate 81 for mounting the rods in mutually spaced, parallel relationship. By way of example, the rod 79 and the plate 81 may be made of stainless steel or another material acceptable from a sanitary point of view.

For instance, the rods 79 and the plate 81 may be made of an acrylic plastic material.

The molds under consideration also have second means for providing a cavity for receiving the solidifiable fluid mass of cheese (see 74, FIG. 19) and for receiving the rods 79. The rods are removable from the cavity (see FIG. 22) to leave the elongate holes 76 (see FIG. 23) when the mass of cheese of sufficiently solidified in the cavity.

Figure 12:
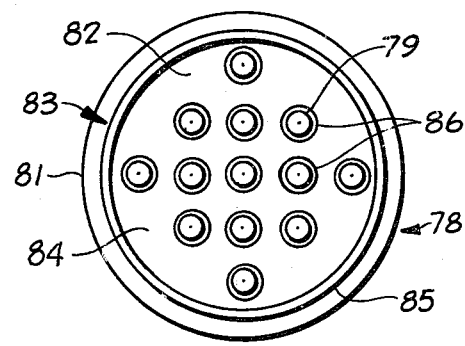
FIG. 12 is a view taken on the line 12—12 in FIG. 11.
Figure 13:
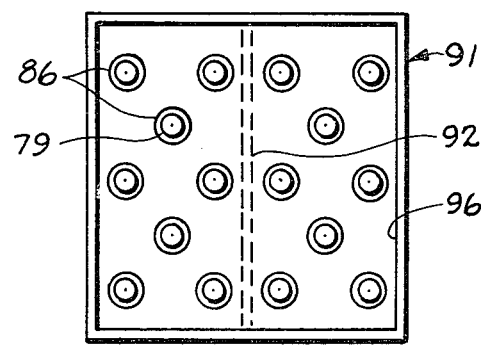
FIG. 13 is a view similar to FIG. 12 for preparing cheese topping according to a further preferred embodiment of the subject invention.
Figure 16:
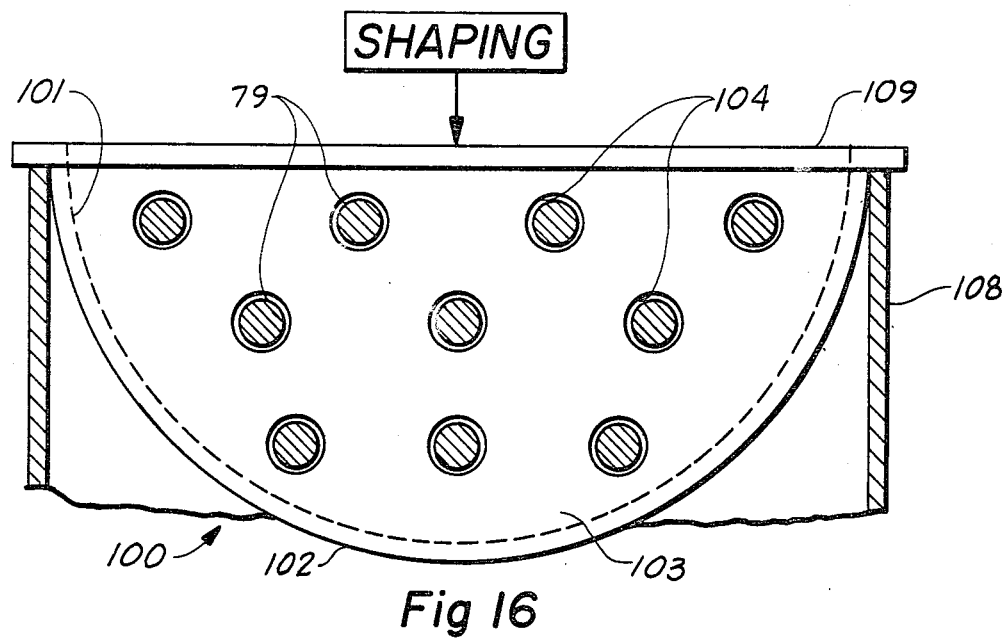
FIG. 16 is an elevation taken on the line 16—16 in FIG. 15.
Figure 15:
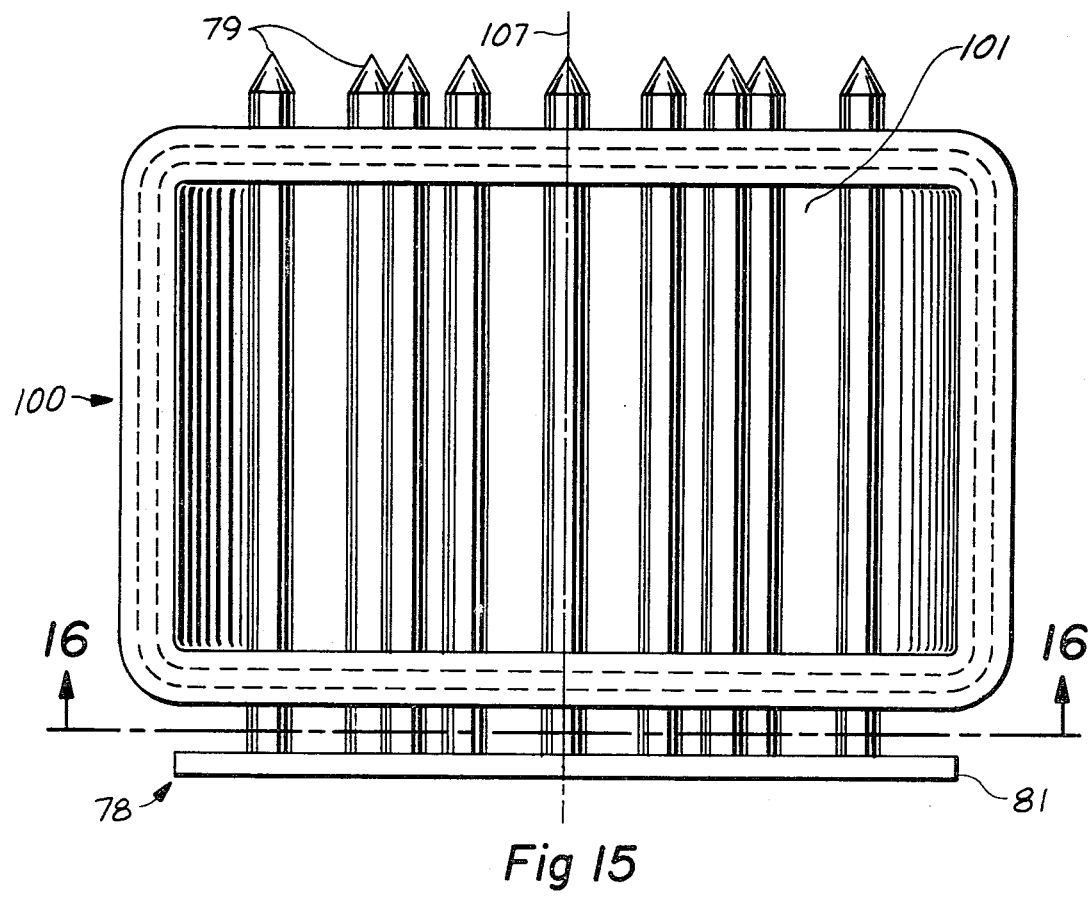
FIG. 15 is a top view of the mold assembly of FIG. 14 with a lid removed.

In FIGS. 11 and 12, the mold cavity is circular cylindrical. In FIG. 13, it is square or rectangular prismatic. In FIGS. 14 to 16, the mold cavity is semicircular. In FIGS. 17 and 18, on the other hand it is quarter round.

In the mold assembly of FIGS. 11 and 12, the cylindrical cavity 82 is formed or delimited by a mold 83 having a bottom 84 and a hollow-cylindrical wall portion 85 extending from the bottom 84. The wall portion 85 preferably is integral with the bottom 84.

The mold 83, as well as the other molds shown in FIGS. 13 to 23, 25 and 26 may be made of the same material as the rods 79. As seen in FIG. 12, the bottom 83 has apertures 86 for receiving the rods through that bottom. As indicated in FIG. 11 with the aid of dotted lines 87, the rods may be inserted through the bottom 84 into the cavity 82 and may subsequently be removed from that cavity when the poured mass of cheese (see 74, FIG. 19) has solidified in the mold. Upon removal from the cavity 82, the rods 79 leave the previously mentioned holes 76 in the cast piece of theese 75 (see FIG. 23).

The block labeled "SHAPING" in FIG. 16 symbolizes for all the mold assemblies their making from the materials of which they are formed. For example, the molds may be thermoformed, drawn, molded, fabricated or otherwise formed or shaped as desired or expedient.

The assembly shown in FIG. 11 also includes a lid 87 for the mold 83. This lid may have apertures 88 for receiving projecting portions of the rods 79, and a handle 89 for manipulation of the lead 87 relative to the mold 83. In particular, the lid 83 may be moved down onto a fluid mass of cheese cast into the mold cavity 82. After the cast cheese mass has solidified in the mold, the lid 87 may be removed therefrom preparatory to the removal of the solidified mass of cheese.

In the illustrated preferred mold embodiments, the rods 79, when inserted into the mold or cavity through holes or apertures communicating with that cavity, extend in parallel to a longitudinal axis of the mold. In this respect, this longitudinal axis in the embodiment of FIGS. 11 and 12 may be the axis of symmetry of the cylindrical mold 83. In the other embodiments, the particular longitudinal axis is an axis extending in parallel to the curved part or surface of the mold.

FIG. 13 illustrates a modification of the mold assembly of FIGS. 11 and 12, wherein the mold is prismatic or square as shown at 91, rather than cylindrical as shown at 83.

The mold 91 is suitable for casting prismatic or parallelepiped pieces of cheese which have the requisite holes (see 76, FIG. 23) and from which square or rectangular apertured slices for topping square or rectangular pies may be cut. By way of example, an apertured square slice of topping cheese 10" has been shown in FIG. 4.

As indicated by a dotted double line 92, the mold of FIG. 13 may be modified for the casting of half pieces of cheese from which rectangular slices, such as the slices 93 and 94 shown in FIG. 9, may be cut. In this respect, the slices 93 and 94 shown in FIG. 9 may form a single layer cheese topping 95 when contiguously arranged on a square pizza pie.

By way of further alternative, the square mold of FIG. 13 may be dimensioned to cast pieces of cheese from which apertured quarter slices may be cut. Each set of these quarter slices may then form a single-layer cheese topping when contiguously arranged on a square pizza pie. In all these cases, the single layer of cheese extends into and along the peripheral or perimetric region of the pie shell.

The prismatic mold cavity 96 is in particular dimensioned so that the specific number of resulting slices, (one, two, four) constituting the single cheese topping layer, will cover the food items completely except for the apertures 21 etc.

The mold assembly 100 shown in FIGS. 14 to 16 defines a mold cavity 101 having a semicircular cross-section for casting semicircular pieces of cheese from solidifiable fluid masses of cheese received in the mold cavity, according to a preferred embodiment of the subject invention.

In particular, the assembly 100 includes a mold 102 having a semicircular cross-section for receiving the solidifiable fluid mass of cheese (see 74, FIG. 19). The mold 102 has a side wall 103 extending parallel to the semicircular cross-section of the mold and having apertures 104 for receiving the rods 79 through the side wall 103 and into the mold cavity 104. In the embodiment shown in FIGS. 14 to 16, the mold 102 has a pair of side walls 103 and 105 extending parallel to the semicircular cross-section of the mold and having the cavity 101 of the mold located therebetween. Registering apertures 104 are in this particular embodiment provided in both of the side walls 103 and 105, so that the rods 79 can extend through both side walls and throughout the mold cavity 101. In practice, this is, however, not absolutely necessary. For instance, only the side wall 103 could be provided with the apertures 104, in which case the rods 79 could be inserted through the side wall 103 into the cavity 101 and into close proximity to the second side wall 105. In practical application, this may leave a non-apertured remnant which would be removed during slicing of the cast piece of cheese.

In the embodiment shown in FIGS. 14 to 16, the rods 79 extend parallel to a longitudinal axis 107 of the mold cavity. The longitudinal axis in this respect, is a central axis extending in parallel to the semicircular surface of the mold 102 or, in other words, at right angles to the semicircular cross-section of the mold cavity 101.

The mold 102 may be supported during casting and solidification of the cheese mass in any desired manner, such as by a box-like support, part of which is seen at 108 in FIG. 16.

The mold 102 has a top rim portion or flange 109 which is integral with the remainder of the mold 102. As shown in FIG. 14, the flange 109 may cooperate with a top 110 to permit a closure of the mold during at least part of the solidification of the fluid cheese in the mold.

By way of example, the top 110 may be a flat plate of the same material as the mold 102 and may be releasably fastened to the flange 109, such as by clamps 112 and 113.

A quarter round mold assembly 115 is shown in FIGS. 17 and 18 in accordance with a further embodiment.

A quarter round mold assembly 115 serves to cast quarter round pieces of apertured cheese from which quarter round apertured slices of cheese 64, 65, 66 and 67 may be cut (see FIG. 10). As shown in FIG. 5, the quarter round apertured slices of cheese may be contiguously arranged in sets of four slices. Each set of four slices then forms a single layer of cheese topping on a pizza pie.

The quarter round mold assembly 115 of FIGS. 17 and 18 in effect is equivalent to one half of the semicircular mold assembly 100 to the left of the longitudinal axis 107 shown in FIG. 15. Accordingly, no special top view has been shown for the quarter round mold assembly 115, as its top view is closely similar to the one half of the top view of FIG. 15 to the left-hand side of the longitudinal axis 107.

The mold assembly 115 shown in FIGS. 17 and 18 defines a cavity 117 having a quarter round cross-section for receiving a solidifiable fluid mass of cheese and for receiving the rods 79 in parallel to a longitudinal axis of the cavity 117. This longitudinal axis or the rods 79, extend at right angles to the quarter round cross-section of the cavity 117.

The illustrated mold assembly 115 includes a mold 118 having a quarter round cross-section with a curved wall 119 and a straight wall 120, as well as side walls 121 and 122 for delimiting the quarter round cavity 117. The side walls 121 and 122 extend parallel to the quarter round cross-section of the mold 118 and have apertures 104 for receiving the rods 79. As in the case of the semicircular mold 102, the apertures 104 may be provided in only one of the side walls, such as the side wall 121, whereby the rods are still receivable through that side wall and into and through most of the mold cavity 117.

By way of optional modification, the mold 118 has been shown as provided with lateral ribs 123 serving as reinforcement and as support of the mold. The semicircular mold 102 may be provided with similar ribs, if desired.

The rods 79 are again removable from the mold 118 to leave the elongate holes (see 76, FIG. 23) when the mass of cheese has solidified in the cavity 117. Quarter round apertured slices of cheese 64 to 67 may then be cut from the solidified piece of cheese.

Use of the mold assembly 100 in making cheese topping will now be described with the aid of FIGS. 19 to 26. In this respect, while FIGS. 19 to 23, 25 and 26 show the mold assembly 100, it should be understood that the disclosed principles are equally applicable to the mold assemblies 83 and 115.

As shown at 74 and 125 in FIG. 19, a solidifiable fluid mass of pizza pie topping cheese is poured in its fluid state into the cavity (see 101 of FIG. 15) of the mold 102.

By way of example, the fluid mass of cheese may be the type of fluid cheese curd which occurs in cheese making processes after separation of the wey. As mentioned above, mozzarella, Parmesan, Muenster or jack cheeses or blends thereof may be used for making pizza pie cheese toppings. By way of contrast, those skilled in the pizza pie making art know that such salty and hard cheeses as Swiss or Emmenthaler cheese never have been used or suitable as pizza pie topping cheese, despite the fact that such type of cheese has natural holes throughout. In particular, comparative tests conducted with Swiss cheese have resulted in "pizza pies" having unsightly, ill-smelling and ill-tasting toppings of burnt and blistered cheese toppings that could not be rendered even-textured and appetizing in any manner.

On the other hand, cheeses that are suitable for pizza pie topping purposes include those that are sometimes referred to by the Italian expression "pasta filata," referring to a spun or stringy curd and sharing its characteristic of stringiness or "filatura" with the provolone family of cheeses. Reference may, in this respect, also be had to U.S. Pat. No. 3,961,077, for pasta filata cheese production by stored curd process, which, together with the patents and literature cited therein, is herewith incorporated by reference herein.

By way of example and not by way of limitation, excellent pizza pie topping cheese, which stretches and smoothens out evenly during cooking in order to grab the pizza sauce and other ingredients, may be realized with mozzarella into which a beneficial stringiness and moisture has been worked in by kneading and stretching in hot water.

The mass in the cavity is provided with the rods 79 so as to provide for the holes 76 (see FIG. 23) which, in turn, result in the apertures 21, etc. in the cut slices of cheese. According to the embodiment shown in FIG. 19, the fluid mass of cheese 74 is poured into the mold cavity and inbetween the rods 79 while these rods are present in the mold cavity to provide for the mentioned holes and apertures. Alternatively, and as shown in FIG. 25, the fluid cheese mass 74 is poured into the mold cavity prior to insertion of the rods 79, according to a further embodiment of the subject invention.

The embodiment of FIG. 19 may be preferably where the poured cheese mass has a consistency similar to a bread dough. On the other hand, if the consistency of the poured cheese is more in the nature of that of taffy, the method of FIG. 25 may be preferable. In that case, losses of cheese mass through the mold apertures 104 prior to insertion of the rods 79 may be negligible. However, if the uncovered apertures 104 present a problem in the pouring of the cheese according to FIG. 25, the mold 102 may be provided with removable side walls as indicated at 132 and 133 in FIG. 25. As further indicated by dotted line, these side walls, which temporarily cover the apertures 104, are removed prior to insertion of the rods 79 into the mold.

The actual insertion of the rods 79 into the mold 102 proceeds according to FIG. 26 which, in dotted outline at 79′, shows the rods prior to their insertion into the mold through the apertures 104.

Accordingly, the modification shown in FIGS. 25 and 26 would first pour the fluid mass of cheese 74 into the mold while the rods 79 are removed therefrom and, as shown more specifically in FIG. 26, would then insert the rods 79 into the mold cavity to provide for the holes 76 or apertures 21 after the mass of cheese has been poured into the mold cavity. As shown in the drawings, the tips of the rods 79 are pointed to facilitate insertion of the rods into the mold and through the poured mass of cheese.

After the fluid mass of cheese has been poured according to FIG. 19 or according to FIGS. 25 and 26, the mold 102 with inserted rods 79 and poured cheese content is advanced to a cold water bath 135. Prior to immersion of the filled mold assembled 100 into the cold water bath, the mold is closed by the top or lid 110.

The cold water bath 135 promotes setting for solidification of the poured cheese in the mold. Typically, the filled mold remains immersed in the water bath for about an hour. In this respect, the fluid cheese mass 74 may be poured from the reservoir 125 while in a heated state, and may then be cooled to or below room temperature in the water bath 135.

The mold assembly is then removed from the water bath 135 shown in FIG. 20 and is transferred to a curing or aging bath 137 shown in FIG. 21. The lid 110 may be removed from the mold assembly prior to the immersion of that assembly into the curing bath 137 so as to permit better access of the curing solution to the cheese content of the mold. The rods 79 may, however, be left in the mold assembly as shown in FIG. 21 to prevent collapsing or obliteration of the holes in the poured cheese mass. The aging solution may, however, penetrate the cheese content of the mold between the rods and wall portions of the apertures 104 to promote curing of the cheese mass at, and fortification of, the holes 76. By way of example, the curing solution may be brine which, in the case of a semicircular mold may act in the bath 137 on the cheese content of the mold 102 for about twelve hours at room temperature.

This by way of example and not by way of limitation.

After removal of the mold assembly 100 from the curing bath 137 the rods 79 are withdrawn from the mold 102 and from the solidified mass of cheese contained therein, as partially shown in FIG. 22. The rods 79 thereby leave in the solidified cheese mass a number of elongate holes 76 corresponding to the rods 79.

As shown in FIG. 23, the mold 102 may then be inverted and the solidified piece of cheese permitted to leave the mold 102 under its own weight. Air entering the mold apertures 104 as shown by arrows 139 thereby break any vacuum that might otherwise occur in the mold when the cheese contents 75 move downwardly as indicated by the arrow 141 in FIG. 23. The mold is then reusable for a further casting process.

The solidified piece of cheese 75, on the other hand, is advanced to a slicer 42 which cuts the apertured slices of cheese therefrom. These slices are either circular as shown at 10 in FIG. 1, if the piece of cheese has been prepared in a cylindrical mold 83. On the other hand, the slices will be quarter round as shown at 64 to 67 in FIG. 10, if the type of mold shown in FIGS. 17 and 18 is used. Similarly, the slices will be semicircular as shown at 71 and 72 in FIG. 6, if the semicircular mold shown in FIGS. 14 to 16 is employed for making the piece of cheese 75. The slicer 42 diagrammatically shown in FIG. 24 may be a food slicer which, for instance, has an oscillating guillotine blade or a rotating circular knife.

The apertured cut slices of cheese may be presented to the operator on a conveyor belt 143.

Prior to the application of the apertured slices to pizza or other pies, these slices may be stored, packaged and shipped as desired.

In the case of semicircular slices, the apertured slices 71 and 72 may be identical and may be cut from the same slice of cheese 75. Similarly, in the case of quarter round slices, the apertured slices 64 to 67 may be identical and cut from the same piece of apertured cheese. As to each cheese topping layer, the slicer 42 cuts from the solidified mass of cheese 75 as many slices of pizza pie topping cheese as necessary for providing that cheese topping in the form of a layer of pizza pie topping cheese having the above mentioned apertures through which vapor and juice can rise from the food items including the sauce 15.

From the commercial and practical point of view, the semicircular cheese slice version herein disclosed presents an optimized solution. In particular, the curing process is shortened if the poured cheese mass is in a semicircular form, thereby improving the utilization factor of the mold over versions in which a cylindrical piece of cheese is cast. Also, the semicircular version has been found to be easier to slice, to be simpler and more convenient to package and to be easier to apply to the pizza pie as its single-layer cheese topping.

The cheese molding apparatus 151 shown in FIG. 27 includes a table 152 having openings 153 and 154. A solidifiable fluid mass of cheese 74, such as pasta filata or stringy curd of mozzarella or other stringy pizza pie topping cheese, is contained in a hopper 156 issuing at its bottom through the table opening 153 into an elongate auger housing 158. One or more Archimedes screws or augers 159 are longitudinally disposed in the housing 158 and rotated by a motor 161 in order to advance the solidifiable mass of cheese 74 from the inlet opening 153 to the outlet opening 154 through the housing 158. An electric main switch 161' is mounted on the table 152 in order to switch the motor 161 on and off via a conduit 162. A bracket 163 is attached to the table 152 and carries a hydraulic actuator 164 which applies and releases a hold-down bar 165 via a plunger 166 to the mold at the molding head. A hydraulic switch 167 is provided for a selective actuation of the plunger 166.

The type of cheese molding machine of the apparatus 151 so far described is commercially available, such as from the Stainless Steel Fabricating, Inc. of Columbus, Wisconsin 53925. What is new according to the illustrated preferred embodiment of the subject invention is the mold assembly 169, by itself, as well as in combination with the cheese molding machine. As seen, for instance, in FIGS. 27 and 29, the mold assembly 169 includes a number of rods 79 for providing the elongate holes 76 in the resulting piece of cheese 75.

As seen in FIGS. 27 and 28, the mold assembly 169 further includes a sleeve 172 laterally enclosing a cavity 173 for receiving the rods 79 and the solidifiable fluid mass of cheese 74. A cover 174 for the cavity 173 is releasably attachable to the sleeve 172 and has the rods 79 attached thereto in mutually spaced, parallel relationship. In accordance with the principles of the subject invention, the sleeve 172 and the cover 174 with attached rods 79 are movable relative to each other.

The sleeve 172 and cover 174 have mating brackets 176 and 177 for releasable mutual attachment of the cover and sleeve via clamps 178.

The sleeve 172 has an open end 179 opposite the cover 174. In this manner, the cavity 173 extends from a top 181 to an open bottom 182 for receiving the mass 74 in its fluid state. With the cover 174 applied to the sleeve 172 of the mold assembly, the rods 79 extend from end to end through the sleeve 79 or from the top 181 to the open bottom 182.

Means for closing the open bottom 182 of the sleeve include the table 152 which supports the sleeve 172 at the bottom 182 and which thus jointly provides with the sleeve 172 a cavity for receiving the solidifiable fluid mass of cheese 74. In this respect, the table 152 has the above mentioned opening 154 communicating with the mold cavity 173.

The table opening 154 is shown in dotted outline in FIG. 29 to illustrate an approximate relationship of that cheese inlet opening to the rods 79. As also indicated in FIG. 29 in dotted outlines at 184, the number of rods 79 may be increased as desired for the provision of a larger number of apertures in the resulting cheese slices.

The table 152 has a depression 186 for receiving and mounting the mold assembly 169 via its sleeve 172. The cover 174 acts as a lid covering the top 181 of the sleeve 172, with the hydraulic actuator 164 being releasably coupled to the top, lid or cover 174 via transverse bar 165 and plunger 166 for applying the sleeve 172 to the table 152.

The auger assembly 158, 159 constitutes means connected to the table 152 for extruding the fluid mass of cheese through the opening 154 into the mold cavity 173 inbetween the mutually spaced, parallel rods 79. Upon actuation of the motor switch 161', the mass of cheese 74 is forced in its fluid state through the open bottom 182 into the cavity inbetween the inserted rods 79. The expression "fluid state" as herein employed is intended to be broad enough to extend to a high viscosity, such as the consistency of taffy. The cover or lid 174 may have an opening 188, permitting the operator to determine the instant at which sufficient mass of cheese has been forced into the mold in order to fill the cavity 173. At that instant, the operator may open the motor switch 161' to interrupt the extrusion of cheese into the mold.

The high-compression extrusion of cheese into the cavity provides for a certain solidification of the injected cheese mass. In other words, the injected cheese mass in the mold assembly 169 is sufficiently self-supporting to permit a removal of the mold assembly from the table 152 without a loss of the injected cheese through the open bottom 182 of the sleeve 172. The friction between the injected cheese mass and the inner wall of the sleeve 172, and the friction between the rods 79 and the injected mass of cheese assist the releasable retention of the injected mass in the cavity 173. If desired or necessary, the mold assembly may have further means for retaining the mass of cheese in the cavity 173, such as a member projecting from the sleeve 172 inwardly at a distance from the cover 174. In particular, the mold assembly 169 may include a shelf 191 at the open end 182 of the sleeve 172 opposite the cover 174, for supporting the injected mass of cheese in the cavity 173.

In the illustrated preferred embodiment shown in FIG. 28, the sleeve 172 has two corners, and the mold assembly includes a shelf 191 at each of these corners at the end of the sleeve 172 opposite the cover 174. The sleeve 172 has the above mentioned opening 179 at the shelf 191 for admittance of the fluid mass of cheese to the cavity 173. In this structure, the shelves 191 perform the further function of reducing the size of the opening 179 or open bottom 182 for an adaptation of the mold assembly 169 to smaller molding heads.

A comment about the solidification of the fluid mass of cheese may be in order at this juncture. In particular, the concept of solidification should be viewed in relative terms with respect to the molded cheese mass. For one thing, the desired layers of pizza pie topping cheese according to the subject invention should in a sense be plastic, displaying stretchability along with adaptability to the pie topography, especially when heated during the cooking of the pie. The molded pieces of cheese typically are thus never completely solid in a rigid sense. Also, the molded cheese pieces may be removed from the mold assembly prior to curing or progressing solidification. For instance, the molded cheese pieces may be removed from the mold as soon as the cheese mass has become sufficiently self-supporting to prevent a collapse of the elongate holes formed by the rods 79.

It is thus seen that in the methods herein disclosed with reference to FIGS. 19 to 35, the fluid mass of cheese 74 which has been poured, forced or otherwise placed in the mold assembly 100 or 169 is subjected to solidification which may range from the placement or forcing of the mass of cheese into the mold assembly through the curing preparatory to slicing, as shown in FIG. 24. In the course of such solidification, and typically at the beginning thereof as shown in FIGS. 19, 26 and 27, there are provided in the poured, forced or otherwise placed mass of cheese in the mold cavity with the rod 79 a number of elongate holes 76 corresponding to these rods.

In particular, and with reference to FIGS. 27 and 30, the latter hole-forming process already starts when the fluid mass of cheese 74 is forced into the mold cavity 173 inbetween the rods 79. At that time there already takes place a certain solidification of the injected cheese mass. This partially solidified mass of cheese is retained in the sleeve 172, and the mold assembly including that sleeve and the covering lid 174 are inverted or placed on its top as shown in FIG. 30 to support the sleeve 172 and retain partially solidified mass with the lid or cover 174. The contained mass of cheese in the sleeve 172 is further solidified while the lid or cover 174 is supporting such sleeve and retained mass. To this end, the mold assembly and retained mass of cheese may be subjected to a cooling step or operation.

By way of example, and as shown in FIG. 30, the mold assembly 169 with contained mass of cheese is advanced to a cold water bath 135 of the above mentioned type, with the cover or lid 174 supporting the inverted mold assembly 169 and contained cheese mass as mentioned above. The comments set forth above with respect to the cold water bath 135 of FIG. 20 also apply to the cooling step of FIG. 30. As seen in FIGS. 27 and 29, the rods 79 may be tubular, having longitudinal bores 193 for receiving a cooling fluid. For instance, the tubular rods 79 may be cooled by the cold water in the bath 135 while the rods are still in the contained mass of cheese to promote solidification of that poured or forced mass.

Of course, this tubular variation does not rule out the use of solid rods at 79. For instance, such rods may be made of a sanitary heat-conducting material, such as solid stainless steel, which also will conduct heat away from the contained mass of cheese to the cold water bath 135.

After the contained mass of cheese has attained at least a sufficient solidification to prevent a collapse of the formed elongate holes 76 upon removal of the rods 79, the mold assembly 169 with the sufficiently solidified contained mass of cheese is removed from the cold water bath 135. The retention clamps 178 are then removed from the mating brackets 76 and the sleeve 172 and rods 79 with lid or cover 174 are removed from the resulting piece of cheese 75, while the rods 79 thereby leave the desired elongate holes 76. In practice, the rods 79 may be pulled out of the formed piece of cheese 75 and that piece of cheese may then be removed from the sleeve 172. On the other hand, the sleeve 172 may be slid from the formed piece of cheese 75, and that piece of cheese and rods 79 may then be separated from each other.

The formed piece of cheese 75 is then immersed into a curing or aging bath 137 already described above with reference to FIG. 21. As shown in FIG. 32, the formed piece of cheese 75 may float in the brine solution of the curing bath 137. The brine solution 137 enters the elongate holes 76 of the piece of cheese 75 in the aging bath 137 to promote curing of the cheese mass at, and fortification of, the holes 76.

In this respect, the curing processing on the exposed piece of cheese 75 according to FIG. 32 is generally preferable to the curing process conducted in the mold as shown in FIG. 21. The solidified, cured piece of cheese 75 is again advanced to the slicer 42 which cuts the apertured slices of cheese therefrom, as shown in FIG. 24. As shown in FIG. 28, the sleeve 172 is preferably semi-cylindrical, for providing a semi-cylindrical piece of cheese 75 from which semicircular slices of pizza pie topping cheese are cut by the slicer 42 providing the desired cheese topping for the pizza pie in the form of a layer composed of two semicircular slices when contiguously arranged on the food items as described above. It will be recalled in this respect that such pizza pie topping layer then has the required apertures through which vapor and juice can rise from the food items including the tomato sauce on the pie shell.

Alternatively, and as indicated in FIGS. 28 and 29 by a dotted line 195, the sleeve 172 and cover 174 may be made quarter round for the provision of quarter round pieces of cheese in the molding process shown in FIG. 27. These pieces are solidified and cured as shown in FIGS. 30 to 32, and quarter round slices are cut from such cured pieces by slicer 42 in FIG. 24, as described above.

As further shown in FIGS. 33 and 34, the sleeve of the mold assembly 169 may be a cylindrical sleeve 172' and the cover or lid may be a circular cover or lid 174' for the production of cylindrical pieces of cheese having elongate holes provided thereto by the rods 79 as before. In the case of a cylindrical mold assembly, the shelf or other projecting member for aiding the retention of the poured or forced mass of cheese in the cylindrical sleeve 172' may be annular, as shown at 191' in FIGS. 33 and 34.

Alternatively, the sleeve of the mold assembly 169 may be prismatic as shown at 172", and the cover or lid may be square as shown at 174" in FIG. 35. The remainder of the mold assemblies shown in FIGS. 33 to 35, and the views of such assemblies, as well as the cheese molding, solidification, curing and slicing steps are in effect the same as described above with reference to FIGS. 20, 21, 24, 27, 30, 31 and 32, except that circular, rectangular or square slices of pizza pie topping cheese are produced.

As already set forth above in the Summary of the Invention and elsewhere, the subject invention also extends to cheese toppings made by the methods of the invention and its preferred embodiments herein set forth. The cheese toppings of the subject invention do, of course, not extend to cheeses in which holes are formed by gas bubble formation during the cheese making process. The cheese toppings according to the subject invention and its preferred embodiments are thus distinct from Swiss cheese, Emmenthaler and other naturally apertured cheeses disclosed, for instance, in U.S. Pat. Nos. 1,415,942, 2,358,526 and 3,046,140.

In fact, the cheese toppings made according to the subject invention are superior in quality and performance and, in their preferred manifestations, are characterized by holes or apertures of a predictability, regularity and uniformity not attainable with Swiss cheese or any other known cheese in which holes are naturally formed through gas bubble formation in the formative stage.

The subject extensive disclosure will suggest or render apparent various modifications and variations within the spirit and scope of the subject invention to those skilled in the art. All of these modifications and variations are intended to be covered within the scope of the appendant claims.

We claim:

1. In apparatus for making a piece of cheese having parallel elongate holes from a solidifiable fluid mass of cheese, the improvement comprising in combination:
   a sleeve extending between an open bottom and an open top;
   means for closing said bottom including a table for supporting said sleeve at said bottom and for jointly providing with said sleeve a cavity for receiving said solidifiable fluid mass of cheese, said table having an opening communicating with said cavity;
   a lid covering the top of said sleeve;
   a number of mutually spaced, parallel rods mounted on said lid and extending from said top to said bottom through said sleeve for providing said elongate holes;
   means releasably coupled to said lid for applying said sleeve to said table; and
   means connected to said table for extruding said fluid mass of cheese through said opening into said cavity and inbetween said spaced rods.

2. Apparatus as claimed in claim 1, wherein:
   said lid is removable from said sleeve; and said lid and sleeve include means for releasably attaching said lid to said sleeve.

3. Apparatus as claimed in claim 2, including:
   means projecting from said sleeve inwardly at a distance from said lid for releasably retaining said extruded mass of cheese in said cavity.

4. Apparatus as claimed in claim 2, including:
   a shelf connected to said sleeve at said bottom for releasably retaining said extruded mass of cheese in said cavity.

5. Apparatus as claimed in claim 1, wherein:
   said sleeve has at least two corners and a shelf at each of said corners at the bottom of said sleeve for releasably retaining said extruded mass of cheese in said cavity.

6. Apparatus as claimed in claim 1, 2, 3, 4 or 5, wherein:
   said rods have longitudinal bores for receiving a cooling fluid.

* * * * *